US008166243B2

(12) United States Patent  (10) Patent No.: US 8,166,243 B2
Tobita  (45) Date of Patent: Apr. 24, 2012

(54) INFORMATION PROCESSING SYSTEM AND PROGRAM FOR CONTROLLING THE INFORMATION PROCESSING SYSTEM

(75) Inventor: Tsunehiro Tobita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 577 days.

(21) Appl. No.: 12/310,447

(22) PCT Filed: Feb. 6, 2009

(86) PCT No.: PCT/JP2009/000476
§ 371 (c)(1),
(2), (4) Date: Feb. 25, 2009

(87) PCT Pub. No.: WO2010/089802
PCT Pub. Date: Aug. 12, 2010

(65) Prior Publication Data
US 2010/0306186 A1  Dec. 2, 2010

(51) Int. Cl.
*G06F 13/16* (2006.01)
*G06F 1/32* (2006.01)
(52) U.S. Cl. .............. 711/114; 707/706; 707/E17.061; 711/156; 711/E12.006; 713/324
(58) Field of Classification Search .................. None
See application file for complete search history.

(56) References Cited

U.S. PATENT DOCUMENTS

| | | | | |
|---|---|---|---|---|
| 5,317,727 A * | 5/1994 | Tsuchida et al. | ............ | 707/704 |
| 7,404,035 B2 * | 7/2008 | Anzai et al. | ............ | 711/114 |
| 7,599,971 B1 * | 10/2009 | Hagerstrom et al. | ............ | 1/1 |
| 7,653,826 B1 * | 1/2010 | Day et al. | ............ | 713/324 |
| 2002/0174370 A1 * | 11/2002 | Berstis | ............ | 713/300 |
| 2007/0113005 A1 * | 5/2007 | Yamamoto et al. | ............ | 711/112 |
| 2007/0150450 A1 * | 6/2007 | Murase | ............ | 707/3 |
| 2007/0250475 A1 * | 10/2007 | Idei et al. | ............ | 707/2 |
| 2008/0049276 A1 * | 2/2008 | Abe | ............ | 358/524 |

(Continued)

FOREIGN PATENT DOCUMENTS

EP  1 770 494 A1  3/2006

(Continued)

OTHER PUBLICATIONS

Heng Zeng et al. "Currentcy: Unifying Policies for Resource Management." 2003. USENIX. ATEC '03.*

(Continued)

*Primary Examiner* — Reginald Bragdon
*Assistant Examiner* — Nathan M Sadler
(74) *Attorney, Agent, or Firm* — Stites & Harbison, PLLC; Juan Carlos A. Marquez, Esq

(57) ABSTRACT

A problem to be solved is to enable the user to read out data stored in a logical unit in a power saving state in a short time in a storage system having a power saving function such as stopping the spindle of the HDD. To solve the problem, candidate document file information is read out according to the keywords inputted by the user from a search system, a predetermined number of document file names are extracted from the highest candidates in the candidate document file information, and the power saving function of the logical units actually storing the extracted document files is controlled (switch the state from the power saving state to the normal operation state).

5 Claims, 25 Drawing Sheets

U.S. PATENT DOCUMENTS

2008/0168227 A1     7/2008    Yagisawa et al.

FOREIGN PATENT DOCUMENTS

| | | |
|---|---|---|
| JP | 2001-093220 | 9/1999 |
| JP | 2005-157710 | 11/2003 |
| WO | WO 2004/049147 A1 | 11/2002 |
| WO | WO 2006/060670 A2 | 6/2006 |

OTHER PUBLICATIONS

Amir Roth et al. "Dependence Based Prefetching for Linked Data Structures." 1998. ACM. ASPLOS VIII.*

Edith Cohen and Haim Kaplan. "Prefetching the means for document transfer: a new approach for reducing Web latency." 2002. Elsevier. Computer Networks. vol. 39. pp. 437-455.*

Doug Downey et al. "Models of Searching and Browsing: Languages, Studies, and Applications." 2007. IJCAI 2007.*

Andreas Weissel et al. "Cooperative I/O—A Novel I/O Semantics for Energy-Aware Applications." 2002. USENIX. OSDI 2002.*

Eduardo Pinheiro and Ricardo Bianchini. "Energy Conservation Techniques for Disk Array-Based Servers." 2004. ACM. ISC'04.*

International Search Report for PCT/JP2009/000476 mailed Nov. 5, 2009.

* cited by examiner

FIG. 2

| Index of LU2 | |
|---|---|
| doc ID | keyword |
| doc1 | key1,key2,key5,key7 |
| doc4 | key4,key7,key8,key9 |

420

| Index of LU3 | |
|---|---|
| doc ID | keyword |
| doc2 | key2,key4,key7,key9 |
| doc3 | key1,key3,key5,key7 |

430

| Index of LU4 | |
|---|---|
| doc ID | keyword |
| doc5 | key3,key10,key11,key12 |
| doc6 | key13,key14,key15,key16 |

Index of LU2 (421)

| doc ID | keyword |
|---|---|
| doc1 | key1,key2,key5,key7 |
| doc3 | key1,key3,key5,key7 |

Index of LU3 (431)

| doc ID | keyword |
|---|---|
| doc2 | key2,key4,key7,key9 |
| doc4 | key4,key7,key8,key9 |

Index of LU4 (441)

| doc ID | keyword |
|---|---|
| doc5 | key3,key10,key11,key12 |
| doc6 | key13,key14,key15,key16 |

FIG. 10

| Index of LU2 | | |
|---|---|---|
| doc ID | keyword | Quoted doc ID |
| doc1 | key1,key2,key5,key7 | |
| doc3 | key1,key3,key5,key7 | |

422

| Index of LU3 | | |
|---|---|---|
| doc ID | keyword | Quoted doc ID |
| doc2 | key2,key4,key7,key9 | doc5 |
| doc4 | key4,key7,key8,key9 | |
| doc5 | key3,key10,key11,key12 | |

432

| Index of LU4 | | |
|---|---|---|
| doc ID | keyword | Quoted doc ID |
| doc6 | key13,key14,key15,key16 | |

| Index of LU2 | | |
|---|---|---|
| doc ID | keyword | Tocal count of extracted cases |
| doc1 | key1,key2,key5,key7 | 50 |
| doc3 | key1,key3,key5,key7 | 3 |
| doc5 | key3,key10,key11,key12 | 75 |

434

| Index of LU3 | | |
|---|---|---|
| doc ID | keyword | Tocal count of extracted cases |
| doc2 | key2,key4,key7,key9 | 5 |
| doc4 | key4,key7,key8,key9 | 0 |

444

| Index of LU4 | | |
|---|---|---|
| doc ID | keyword | Tocal count of extracted cases |
| doc6 | key13,key14,key15,key16 | 2 |

| LU ID | LU startup time |
|-------|-----------------|
| LU2   | T2              |
| LU3   | T3              |
| LU4   | T4              |

INFORMATION PROCESSING SYSTEM AND PROGRAM FOR CONTROLLING THE INFORMATION PROCESSING SYSTEM

TECHNICAL FIELD

The present invention relates to an information processing system and a program for controlling the information processing system, and for example, to an information processing system comprising a storage including one or more logical units, each of the logical units constituted by one or more disk drives, and a host computer that accesses the storage to acquire and store data and a program for controlling the information processing system.

BACKGROUND ART

In a storage that stores data, there is a problem that the power consumption for waiting for data transfer is enormous. A system shown in Patent Document 1 is proposed to solve the problem. Patent Document 1 discloses a function of creating an HDD that stores data with high access frequency and an HDD that stores data with low access frequency, sorting the data to a plurality of types of HDDs according to the access frequency and storing the data, and stopping the spindle motor when the HDD storing the data with low access frequency is not accessed for longer than a predetermined time.

Meanwhile, Patent Document 2 discloses a system that satisfies both response speed and power saving by further subdividing the types of HDDs at the storage location according to the response speed required to read out data and by storing data, in which the access frequency is low but requires high data reading speed, in an HDD, in which the spindle is not stopped.

While the systems described in Patent Document 1 and Patent Document 2 stop the spindle motors on an HDD-by-HDD basis to realize power saving, the power saving function such as stopping the spindle on a disk-array-by-disk-array basis can be realized by using a technique called RAID (Redundant Arrays of Inexpensive Disk) to combine a plurality of disks to constitute a high-capacity disk device (hereinafter referred to as "disk array" in the present invention). The power saving function on a disk-array-by-disk-array basis is disclosed in Patent Document 3, for example.

[Patent Citation 1]
JP Patent Publication (Kokai) No. 2001-93220
[Patent Citation 2]
WO2004/049147
[Patent Citation 3]
JP Patent Publication (Kokai) No. 2005-157710

DISCLOSURE OF INVENTION

Technical Problem

However, in Patent Documents 1 and 3 and Non-Patent Document 1, data with low access frequency not requiring high response speed is stored in an HDD or a disk array in which the spindle is stopped, and it is inevitable that a long time is required to read out data for infrequent access. The reading out of data that requires a long time affects the users in various ways when, for example, many unspecified users search document files in a full-text search system. If a user tries to input a keyword in the full-text search system to extract candidate document file names to actually select and read out a document file from the candidates, it takes a long time to read out the document file when the document file is stored in the spindle-stopped HDD or disk array. As a result, the user may feel stressed to the long reading time, misunderstand that the document file is deleted and does not exist and give up the reading, or misunderstand that the system is shut down by a failure, thereby giving a negative impact on the user. Especially, the problem is more likely to occur when many users, who do not have knowledge that the storage storing the document files includes a power saving function of stopping the spindle of the HDD, refer to the document files through a full-text search system.

The present invention has been made in view of the forgoing circumstances, and the present invention provides a technology (technology that realizes power saving without losing the accessibility) that can read out a document file without giving stress or misleading the user when the user reads out data (such as a document file) from a storage in which the spindle is stopped by a power saving function in a search system.

Technical Solution

In the present invention, a power saving storage system having a function of stopping HDDs reads out candidate document file information according to keywords inputted by the user from a search system and extracts a predetermined number of document file names from the superior candidates of candidate document file information. The power saving storage system then extracts HDDs or disk arrays actually storing the extracted document files and controls the power saving function of the extracted HDDs or disk arrays. The power saving storage system also refers to an index file (hereinafter referred to as "index") and consolidates document files including more than a predetermined number of common keywords into a common HDD or disk array in units capable of controlling and saving power.

Thus, the present invention relates to an information processing system comprising: a storage (300) that includes one or more logical units, each of the logical units constituted by one or more disk drives; and a host computer (1) that accesses the storage to acquire and store data. The host computer (1) comprises: a search engine (210) that executes a search according to an inputted instruction; and an LU startup/power saving processor (220) that generates a state transition command for switching the logical units from a power saving state, in which the access is not allowed, to a normal operation state, in which the access is allowed, when a candidate file list (212) indicated in a search result obtained by the search engine is extracted. The storage (300) comprises a disk controller (310) that activates spindles of the disk drives constituting the logical units to switch the logical units from the power saving state to the normal operation state in response to the state transition command.

More specifically, the LU startup/power saving processor (220) generates a state transition command for switching the logical units storing predetermined N cases (integer N=1 or N>1) of files in a candidate file list (212) indicated in the search result obtained by the search engine from the power saving state, in which the access is not allowed, to the normal operation state, in which the access is allowed, when the candidate file list is extracted. The disk controller (310) activates the spindles of the disk drives constituting the relevant logical units in response to the state transition command.

Furthermore, the host computer or the storage comprises an index file (214) including index information that is used when the search engine (210) performs a search and that is generated corresponding to each logical unit. The search engine (210) generates a move command for moving a plurality of files with more than a predetermined number of keywords into the same LU to consolidate the stored logical unit. The disk controller (310) moves the files to be moved to relevant logical units in response to the move command. After that, the index file (214) of each logical unit is updated.

Further features of the present invention will become apparent by the best mode for carrying out the present invention and the appended drawings.

Advantageous Effects

According to the present invention, an apparent reading time as seen by the user can be reduced by starting up in advance an HDD or a disk array storing candidate document files before the user actually selects and reads out a file from candidate document file information extracted using a search system.

Furthermore, the power saving efficiency can be improved by consolidating document files including common keywords into a common HDD or disk array in units capable of controlling and saving the power so that the number of activated HDDs or disk arrays can be narrowed down.

BRIEF DESCRIPTION OF DRAWINGS

FIG. 2 is a diagram of an example of a search index file in the first embodiment.

FIG. 6 is a diagram of an example of a search index file in a second embodiment.

FIG. 10 is a diagram of an example of a search index file in a third embodiment.

FIG. 16 is a diagram of an example of a search index file in the fifth embodiment.

Figure 1:
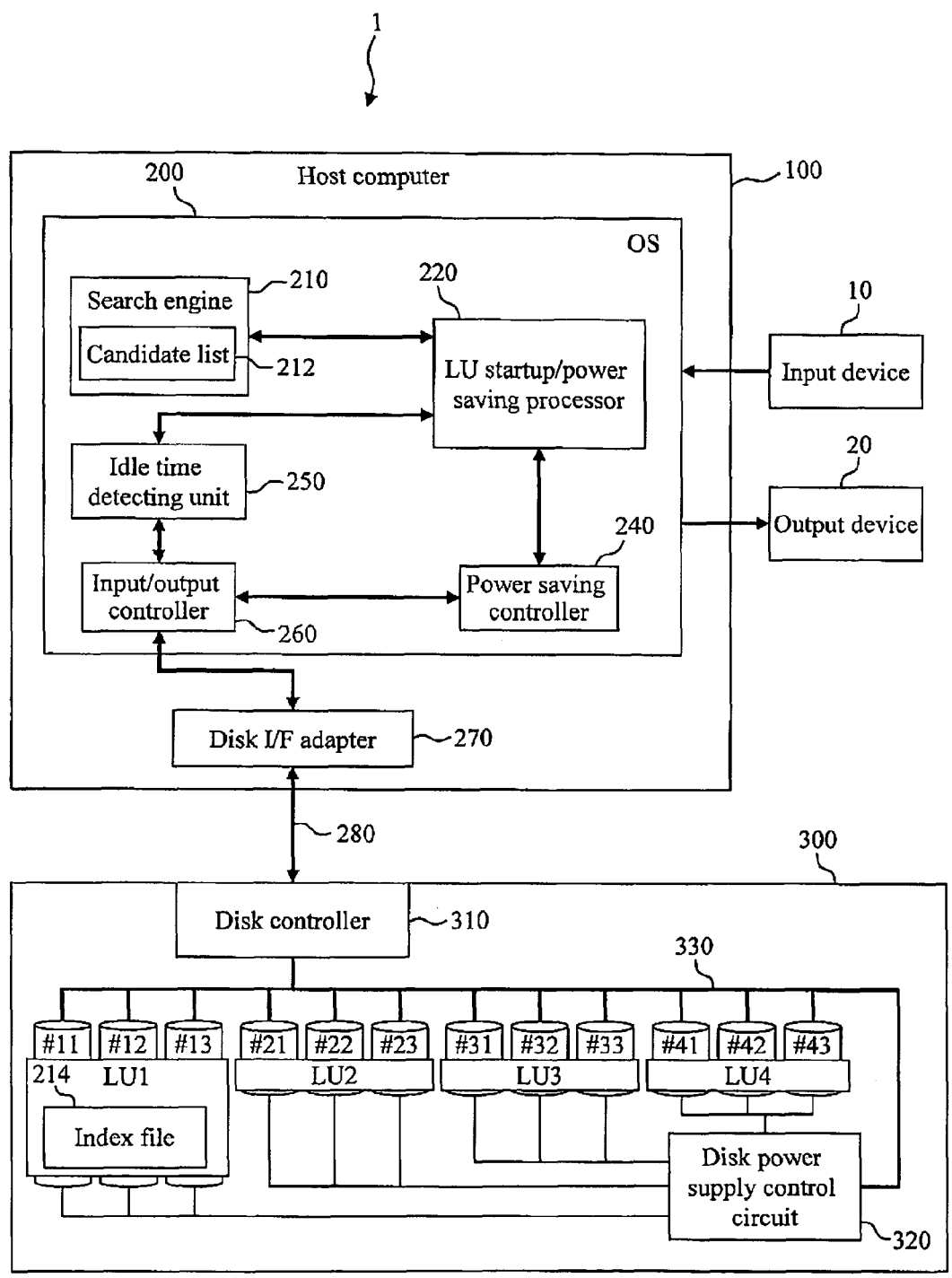
FIG. 1 is a diagram of a schematic configuration example of a search system in a first embodiment.

EXPLANATION OF REFERENCE 1 to 4 . . . search system
10 . . . input device
20 . . . output device
100 . . . host computer
200 . . . operating system
210 . . . search engine
212 . . . candidate list
214 . . . index file
220 . . . LU startup/power saving processor
240 . . . power saving controller
250 . . . idle time detecting unit
270 . . . disk I/F adapter
300 . . . storage
310 . . . disk controller
320 . . . disk power supply control circuit

BEST MODE FOR CARRYING OUT THE INVENTION

The embodiments of the present invention will now be described with reference to the appended drawings. It should be noted that the present embodiments only illustrate an example for realizing the present invention and should not be construed as limitations of the technical scope of the present invention. Common configurations in the drawings are designated with the same reference numerals. A search system will be described in the embodiments as an example.

1) First Embodiment

A search system (information processing system) and a disk control method of the search system according to a first embodiment of the present invention will now be described with reference to the drawings.

<Configuration of Search System>

FIG. 1 is a diagram of a schematic configuration (example) of a search system of a first embodiment. In FIG. 1, a search system 1 comprises at least one host computer 100, a storage 300 storing, for example, document files and image files, an input device 10 that is a device, such as a keyboard and a console terminal, for an input operation by the user required for communication with an operating system (herein after referred to as "OS") 200 on a computer 100, and an output device 20 such as a display device and a printer.

The host computer 100 and the storage 300 are connected through a disk I/F adapter 270 mounted on the host computer 100 and a disk controller 310 mounted on the storage 300. Although an I/F signal 280 that connects the disk I/F adapter and the disk controller 310 communicates in a general communication protocol called SCSI, the communication protocol is not directly related to the object of the present invention and is not limited.

The storage 300 comprises a disk controller 310, hard disk drives (hereinafter "HDD") #11 to 13, #21 to 23, #31 to 33, and #41 to 43, and a disk power supply control circuit 320. The disk power supply control circuit 320 is a circuit that controls power supply to each of the HDDs by a command transmitted from the disk controller 310 through an HDD_I/F signal. A plurality of HDDs #11 to 13, HDDs #21 to 23, HDDs #31 to 33, and HDDs #41 to 43 are connected to the disk controller 310 through the HDD_I/F signal 330. The HDDs #11 to 13, HDDs #21 to 23, HDDs #31 to 33, and HDDs #41 to 43 that are assemblies of three HDDs have a redundant configuration called RAID respectively. The computer 100 accesses the HDD groups in RAID configuration as SCSI logical units (LU). The LUs constituted by the HDDs #11 to 13, HDDs #21 to 23, HDDs #31 to 33, and HDDs #41 to 43 will be referred to as LU1, LU2, LU3, and LU4. Although the LUs are illustrated in FIG. 1 as storage areas across a plurality of HDDs, the LUs may be constituted by a storage area in one HDD. Furthermore, although the number of HDDs constituting each LU is three in FIG. 1, this is not particularly limited.

The host computer 100 comprises the operating system 200 (hereinafter referred to as "OS") and the disk I/F adapter 270. The OS 200 includes: a search engine 210 that executes a search and that outputs (displays) a candidate list to an output device; an LU startup/power saving processor 220 that receives a search result to extract a candidate list 212, extracts or specifies logical units (LUs of the storage 300) to be started up, and notifies the logical units to a power saving controller 240; the power saving controller 240 that outputs a control signal for switching the LUs from the power saving state to the activated state in response to the notification from the LU startup/power saving processor 220; an idle time detecting unit 250 that detects a time (hereinafter referred to as "idle time") that a state (hereinafter referred to as "idle state") of the OS 200 not accessing an arbitrary LU in the storage 300 is continuing; and an input/output controller 260 that controls input and output of signal to the storage 300. The LU startup/power saving processor 220 periodically reads out the idle time of each LU from the idle time detecting unit 250, and when an LU in the idle state for longer than a predetermined time is detected, inputs a command for saving the power of the LU to the power saving controller 240. The OS 200 that is operated on the host computer 100 inputs and outputs data to the storage 300 through the input/output controller 260. After receiving the command of power saving, the power saving controller 240 executes a process of putting the relevant LU into the power saving state through the input/output controller 260. In the process of putting the relevant LU into the power saving state, all spindles of the HDDs constituting the relevant LU are stopped, and the power of the HDDs are turned off. An example of the process of stopping the spindles of the HDDs is shown in Patent Document 1, and an example of the process of turning off the power of the HDDs constituting the LU is shown in Patent Document 2. Since the processes are not a direct object of the present invention, the detailed description will be omitted.

<Specific Operation and Process>

A specific operation and a process of the search system 1 in the first embodiment will now be described. The user of the host computer 100 accesses the search engine 210 that is operated on the OS 200 through the input device 10 and inputs keywords of a document that the user wants to quote. The search engine 210 extracts titles of document files related to the inputted keywords from an index file 214 and lists a predetermined number of titles in order of most related to the keywords. The listed result will be called a candidate list 212 in the present description. The search engine 210 also provides the candidate list 212 to the user through the output device 20 and provides the candidate list 212 to the LU/power saving processor 220 at the same time. Although the index file 214 is stored in the LU1 herein, the host computer 100 may hold the index file 214. Collectively holding the index in one LU called LU1 allows to always start up only the LU1. If each host computer holds the index files, there would be no need to always start up the LU. However, it should be noted that there are also disadvantages in that the workload of the host computer is increased if the size of the index files is large and that the updating process of the index files is cumbersome.

The LU/power saving processor 220 acquires the candidate list 212 from the search engine 210, extracts LUs that actually store a predetermined number of document files from the top of the candidate list 212, and transmits a command for starting up the extracted LUs from the power saving state to the normal operation state to the power saving controller 240. The process of specifying the LUs that actually store the document files is one of the fundamental processes implemented in a typical read/write process of document file by the OS 200. Therefore, the detailed description will be omitted.

After receiving the command for activating the extracted LUs into the normal operation state, the power saving controller 240 executes a process of activating the relevant LUs from the power saving state to the normal operation state through the input/output controller 260. In the process of activating the relevant LUs into the normal operation state, the power of all HDDs constituting the relevant LUs is turned on, and the spindle of each HDD is started up. The activation process is omitted when the relevant LUs are already in the normal operation state. An example of the process of turning on the power of the HDDs constituting the LUs is shown in Patent Document 3, and an example of the process of starting up the spindle of each HDD is shown in Patent Document 1. Since the processes are not a direct object of the present invention, the detailed description will be omitted.

The index file 214 is always referred first during the full-text search by the user. Therefore, the LU1 storing the index file 214 is controlled to always maintain the normal operation state.

Figure 3:
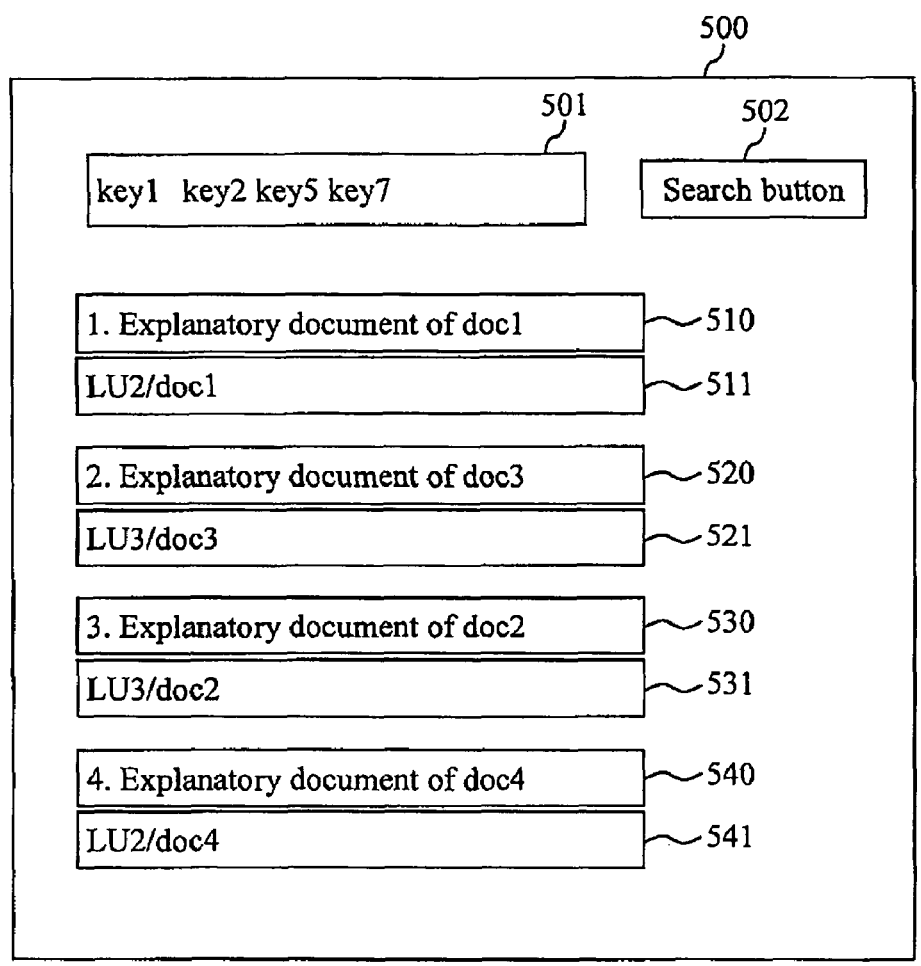
FIG. 3 is a diagram of an example of a search screen display in the first embodiment.

FIG. 2 is a diagram of an example of the index file 214 used in the first embodiment. FIG. 3 is a diagram of a screen example for displaying the candidate list 212 of the search result to the user through the output device 20 in the first embodiment.

In FIG. 2, an index file 420 denotes contents (example) of an index of document files stored in an LU2. According to the example, the index file 420 indicates that the LU2 stores a document file doc1 including keywords key1, key2, key5, and key7 and a document file doc4 including keywords key4, key7, key8, and key9. Although there are only document files doc1 and doc4 to simplify the explanation, the arrangement is not limited to this.

Similarly, an index file 430 denotes contents (example) of an index of document files stored in an LU3. According to the example, the index file 430 indicates that the LU2 stores a document file doc2 including keywords key2, key4, key7, and key9 and a document file doc3 including keywords key1, key3, key5, and key7.

Furthermore, an index file 440 denotes contents of an index file of document files stored in an LU4. According to the example, the index file 440 indicates that the LU4 stores a document file doc5 including keywords key3, key10, key11, and key12 and a document file doc6 including keywords key13, key14, key15, and key16.

In FIG. 3, a GUI screen 500 includes a keyword input unit 501 used when the user executes a search process using the search engine 210, a search button 502, and search result displays 510 to 541. The screen example indicates a result of inputting four keywords key1, key2, key5, and key7 to 501 to execute a search, and candidate files are displayed in order with most input keywords at the top.

Reference numeral 510 denotes an explanatory document of the highest document file in the search result. Reference numeral 511 denotes a storage location and a file name of the document and indicates that the highest document file is doc1 including all of the four keywords.

Similarly, reference numeral 520 denotes an explanatory document of the second highest document file in the search result. Reference numeral 521 denotes a storage location and a file name of the document and indicates that the second highest document file is doc3 including three keywords key1, key5, and key7.

Reference numeral 530 denotes an explanatory document of the third highest document file in the search result. Reference numeral 531 denotes a storage location and a file name of the document and indicates that the third highest document file is doc2 including two keywords key2 and key7.

Furthermore, reference numeral 540 denotes an explanatory document of the fourth highest document file in the search result, and reference numeral 541 indicates a storage location and a file name of the document. The fourth highest document file in the example is doc4 including one keyword key7.

If LUs storing the highest to the third highest document files in the search result are to be activated from the power saving state to the normal operation state in the first embodiment, the LU2 and the LU3 are activated from the power saving state to the normal operation state according to the search result of FIG. 3 before the user actually selects a candidate document file. As a result, the apparent reading time can be reduced as the LUs are activated in advance when the user actually performs an operation of selecting and reading the document file.

Figure 4:
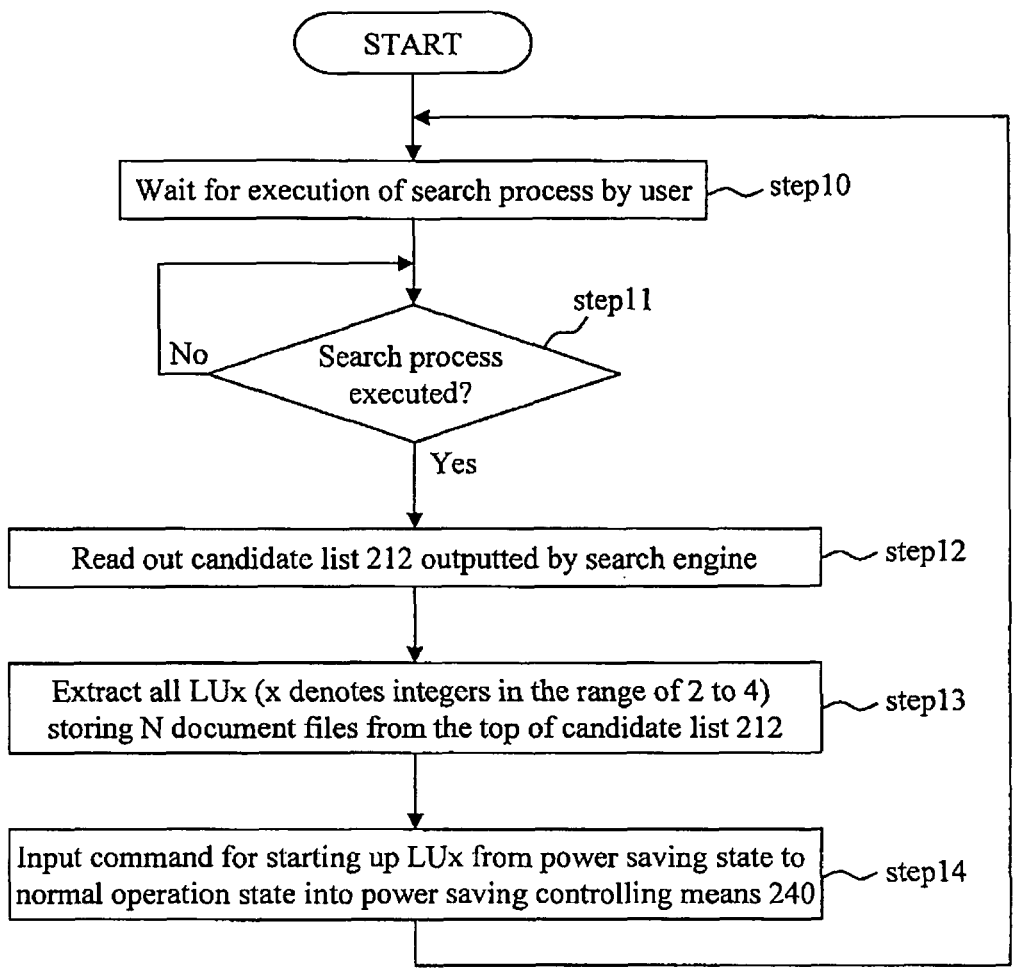
FIG. 4 is a flow chart for explaining a process of putting a related LUs into a normal operation state, the related LUs storing a predetermined number of files in a candidate list of a search result.
Figure 5:
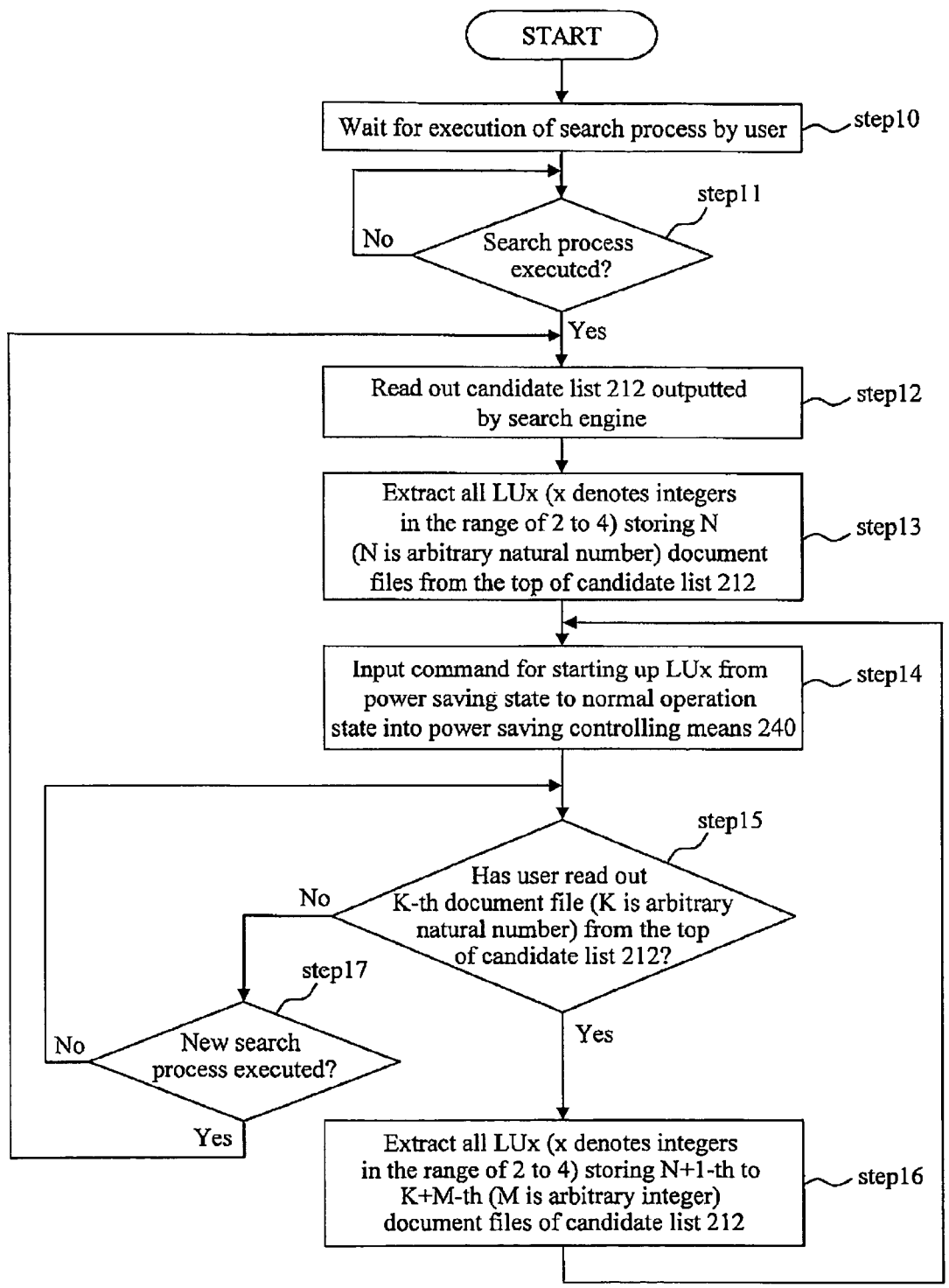
FIG. 5 is a flow chart for explaining a process of sequentially switching new LUs from a power saving state to a normal operation state in connection with a read-out process from the candidate list by the user in the first embodiment.

FIGS. 4 and 5 illustrate flow charts for specifically realizing the above described processes. FIG. 4 is a flow chart for explaining a process of putting related LUs storing a predetermined number of files in the candidate list of the search result into the normal operation state.

According to FIG. 4, the LU startup/power saving processor 220 waits for an execution instruction of search process to the search engine 210 by the user (steps 10 and 11). After recognizing the execution of the search process, the LU startup/power saving processor 220 reads out the candidate list 212 outputted by the search engine (step 12). Meanwhile, the search engine 210 displays the candidate list 212 on the output device (display) 20.

Along with the display of the candidate list 212, the LU startup/power saving processor 220 extracts all LUs storing a predetermined number (N (natural number) cases) of document files from the highest result of the candidate list 212 (step 13). In the example above, the relevant LUs are extracted from the LU2 to LU4.

The LU startup/power saving processor 220 further transmits a command for starting up the relevant LUs from the power saving state to the normal operation state to the power saving controller 240, and the power saving controller 240 notifies the disk controller 310 of the storage 300 through the input/output controller 260 to start up the relevant LUs (step 14).

FIG. 5 is a flow chart for explaining a process of sequentially switching new LUs from the power saving state to the normal operation state in connection with the read-out process from the candidate list by the user.

According to FIG. 5, after the processes of the steps in FIG. 4, the LU startup/power saving processor 220 determines whether a Kth (K is an arbitrary natural number) document file is read out from the candidate list 212 (step 15).

If it is determined that the documents up to the Kth document are not read out (No in step 15), the LU startup/power saving processor 220 determines whether a new search process is executed. If the new search process is not executed, the process moves to step 15, and if the new search process is executed, the process moves to step 12.

If it is determined that the documents up to the Kth document are read out (Yes in step 15), the LU startup/power saving processor 220 extracts all LUs storing N+1th to K+Mth (M is a natural number) candidate document files of the candidate list 212 (step 16). The process then moves to step 14, and relevant LUs are switched from the power saving state to the normal operation state. The activation process is omitted if the LUs are already in the normal operation state. Although the logical units storing the highest to K−1th files of the candidate list 212 are controlled from the normal operation state to the power saving state if a predetermined time has passed without being accessed, the LUs storing up to K−1th document files may be determined not to be used before the predetermined time has passed and be automatically put into the power saving state.

<Alternatives>

In the example of FIG. 1, although the LU startup/power saving processor 220 (including a candidate list detecting function and a startup disk extracting function) and the power saving controller 240 are components separate from the search engine 210, all or part of the components may also be mounted inside the search engine 210. When the components are mounted inside the search engine 210, the present functions can be provided to platforms such as a plurality of hardware and OSs as general functions independent from specific hardware or OSs.

In the example of FIG. 1, although the candidate files are displayed in order with most input keywords at the top, there is no need to limit the search algorithm to the number of keywords, and an arbitrary algorithm can be applied. Furthermore, the keywords may not be characters or words but may also be data such as part of an image. In this case, the data stored in the storage 300 is image data, and the search system 1 can also be used as an image search system.

2) Second Embodiment

The configuration of the search system used in a second embodiment is the same as that (FIG. 1) in the first embodiment. The different point is the process of the search engine 210 creating the index file 214. If there are a plurality of host computers 100, a representative host computer may execute the index file creating process, or LUs handled by the host computers may be predetermined, and the host computers in charge may create index files related to respective LUs to ultimately integrate the index files into the LU1.

The "index creating" in the present embodiment denotes roughly two processes.

The first process is to create a list of all document files stored in the LUs, the list indicating a correspondence between the document ID and the keywords included in the document files (process 1). According to the process 1, when a new document file is added in the LUs after the previous index is newly created or updated before the current update, information indicating the correspondence between the document ID of the document file and the keywords included in the document file is added to the index. According to the process 1, when a new document file is added, the index file is updated as shown in FIG. 2, reflecting the information of the document file.

The second process denotes a process of moving the storage location (LU) of the document files and rearranging the index to organize the document files with common keywords into a common LU when the document files with common keywords are not organized as shown in FIG. 2 in the index updated in the process 1 (process 2).

<Index File Creating Process>

In the second embodiment, it is assumed first that the index file 214 having the same contents as in FIG. 2 is created by step 20 equivalent to the above described process 1.

According to the index file 214 of FIG. 2, the LU2 stores the doc1 including the keywords key1, key2, key5, and key7 and the doc4 including the key4, key7, key8, and key9. The LU3 stores the doc2 including the keywords key2, key4, key7, and key9 and the doc3 including the key1, key3, key5, and key7. Similarly, the LU4 stores the doc5 including keywords key3, key10, key11, and key12 and the doc6 including the key13, key14, key15, and key16.

FIG. 6 is a diagram of a result of the search engine 210 creating a new index file 214 or updating the index file 214 (result of executing the processes 1 and 2) in the second embodiment. The rule in the second embodiment for creating the index is that the files including three or more keywords are stored in the same LU and that the weakly related files with two or less keywords are stored in another same LU.

As a result, for example, the document files doc1 and doc3 including three keywords key1, key5, and key7 are stored in the LU2 in an index 421 of FIG. 6. Similarly, the document files doc2 and doc4 including three keywords key4, key7, and key9 are stored in the LU3 in an index 431 of FIG. 6. Document files doc5 and doc6 including no common keywords are stored in the LU4 in an index 441 of FIG. 6.

Figure 7:
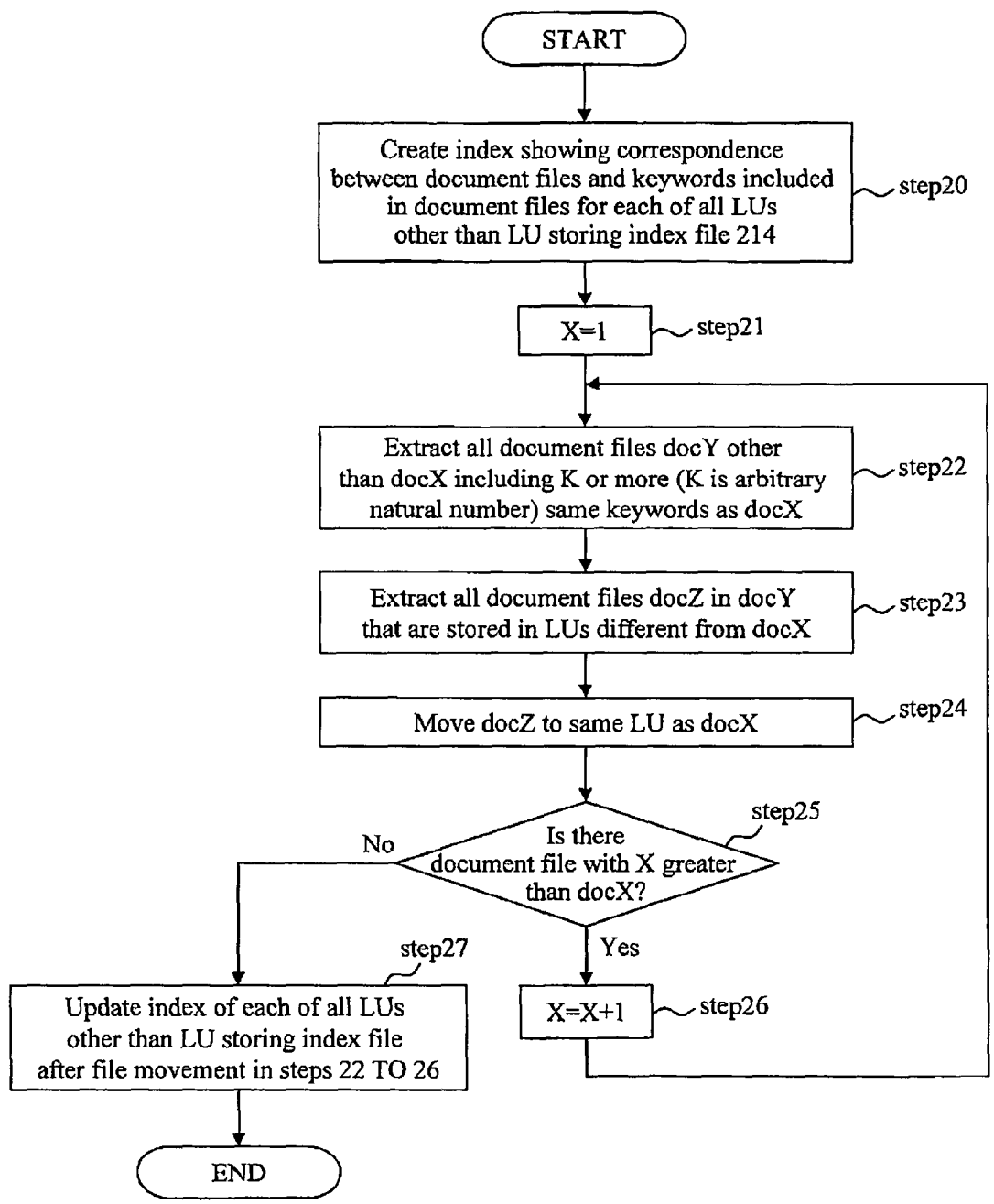
FIG. 7 is a flow chart for explaining a process of storing files including K or more keywords (K is an arbitrary natural number) in the same LU and updating an index file 214 in the second embodiment.

FIG. 7 is a flow chart for explaining a process of storing the files including K or more (K is an arbitrary natural number) keywords in the same LU and updating the index file 214.

The search engine 210 first creates an index showing a correspondence between the document files stored in each LU and the keywords included in the document files for each LU other than the LU1 storing the index file 214 (step 20). This indicates the process 1 described above.

A flow of the process 2 executed in step 21 and after will be described. The search engine 210 sets the document files to be processed to the doc1 (sets X of docX to 1) (step 21).

The search engine 210 then extracts all document files docY (except doc1 (docX)) including K (K is an arbitrary natural number) or more same keywords as the doc1 (docX) (step 22).

The search engine 210 further extracts docZ stored in LUs different from the LU storing the doc1 (docX) among the extracted document files (docY) (step 23). The search engine 210 then instructs the disk controller 310 to move the docZ to the LU the same as the LU storing the doc1 (docX), and the disk controller 310 moves the document files between the LUs based on the instruction (step 24).

Subsequently, the search engine 210 checks whether there is a document file with X greater than docX (doc1) (step 25). If there is such a document file, the process moves to step 22 through step 26, and the processes of steps 22 to 25 are repeated. If there is no such a document file, the process moves to step 27.

Lastly, the search engine 210 integrates and updates the index of the LUs after the document file movement and updates the index file 214 (step 27). This completes the process 2.

The execution of the index creating (updating) process can organize the strongly related document files into a common LU, and the index of the strongly related document files can also be organized in the index file 214. As a result, the LU startup process can be efficiently executed.

Figure 8:
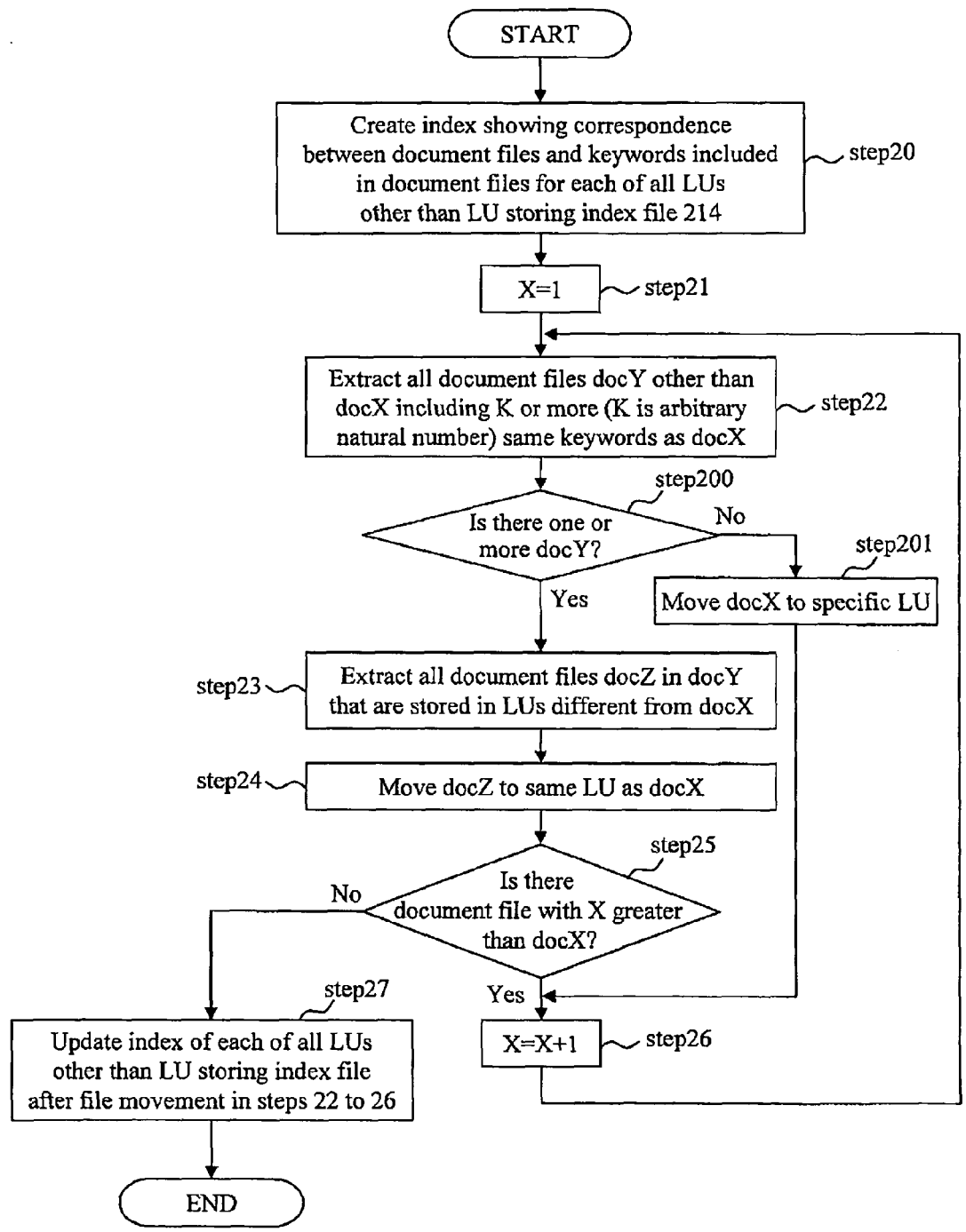
FIG. 8 is a flow chart for explaining a process of moving document files having no other files including K or more common keywords (K is an arbitrary natural number) into a specific LU in the second embodiment.

FIG. 8 is a flow chart for explaining a process of moving document files having no other file including K or more common keywords (K is an arbitrary natural number) into a specific LU.

The search engine 210 first creates an index showing a correspondence between the document files stored in each LU and the keywords included in the document files for each LU other than the LU1 storing the index file 214 (step 20). The search engine 210 then sets the document files to be processed to the doc1 (sets X of docX to 1) (step 21).

The search engine 210 then extracts all document files docY (except doc1 (docX)) including K (K is an arbitrary natural number) or more same keywords as the doc1 (docX) (step Step 22).

The search engine 210 determines whether the number of the extracted document files docY is one or more (step 200). Thus, whether there is a file including K or more common keywords is determined here. If there is no such a file, the search engine 210 determines that the doc1 (docX) is a weakly related special file and instructs the disk controller 310 to move the doc1 (docX) to a specific (predetermined) LU. The LU4 is designated in the present embodiment. In response to the instruction, the disk controller 310 moves the document file to the specific LU (LU4 in the present embodiment) (step 201). The process then moves to step 26. If there is a file including K or more common keywords, the process moves to step 23.

The search engine 210 further extracts docZ stored in LUs different from the LU storing the doc1 (docX) among the extracted document files (docY) (step 23). The search engine 210 then instructs the disk controller 310 to move the docZ to the LU the same as the LU storing the doc1 (docX), and the disk controller 310 moves the document files between the LUs based on the instruction (step S24).

Subsequently, the search engine 210 checks whether there is a document file with X greater than docX (doc1) (step 25).

If there is such a document file, the process moves to step 22 through step 26, and the processes of steps 22 to 25 are repeated. If there is no such a document file, the process moves to step 27.

Lastly, the search engine 210 integrates and updates the index of the LUs after the document file movement and updates the index file 214 (step 27).

<Example of Search Screen>

Figure 9:
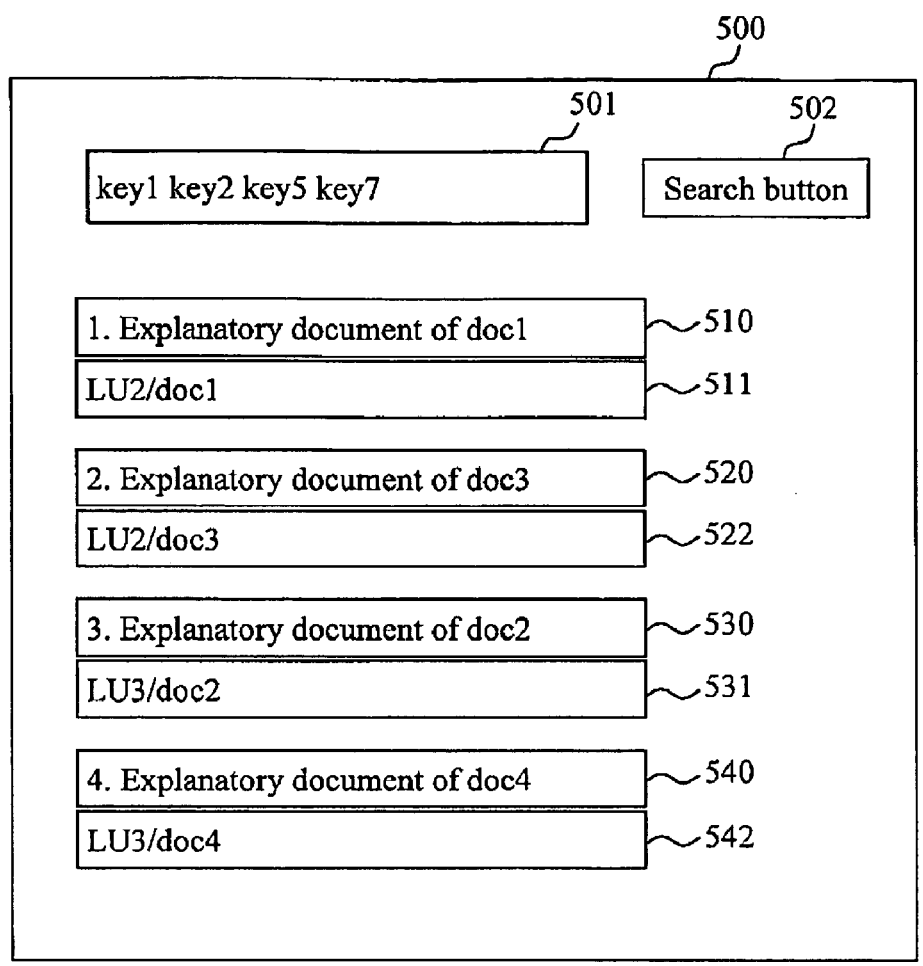
FIG. 9 is a diagram of an example of a search screen display in the second embodiment.

As in FIG. 3, FIG. 9 shows a GUI screen displayed on the output device 20 for the user to execute a search process using the search engine 210 and the same keywords as in the first embodiment in the second embodiment. Only the differences from FIG. 3 will be described.

Reference numeral 522 shows the storage location of the doc3 that is a document file of the second highest candidate in the search result. Although the doc3 is stored in the LU3 in the example of FIG. 3, the doc3 is stored in the LU2 in FIG. 9. Consolidating the document files in a common LU based on the keywords can narrow down the number of LUs activated from the power saving state to the normal operation state. For example, if the storage location LUs of from the highest candidate document file to the second candidate document file are set to be activated into the normal operation state, only the LU2 would be activated. Therefore, the effectiveness of power saving can be increased by removing unnecessary LU activation processing.

3) Third Embodiment

A third embodiment will now be described. The configuration of the search system used in the third embodiment is the same as that (FIG. 1) in the first embodiment. As in the second embodiment, the different point is a process of the search engine 210 creating the index file 214.

As in the second embodiment, the LU2 stores the doc1 including the keywords key1, key2, key5, and key7 and the doc4 including the key4, key7, key8, and key9 in the third embodiment. The LU3 stores the doc2 including the keywords key2, key4, key7, and key9 and the doc3 including the key1, key3, key5, and key7. The LU4 stores the doc5 including the keywords key3, key10, key11, and key12 and the doc6 including the key13, key14, key15, and key16.

FIG. 10 is a diagram of a result of the search engine 210 creating a new index file 214 or updating the index file 214. As in the second embodiment, the rule in the third embodiment for creating the index is that the files including three or more keywords are stored in the same LU and that the weakly related files with two or less keywords are stored in another same LU.

However, the different point from the second embodiment is that if there is another document file quoted in a document file, that information is also stored in the index file, and the quoted document file is also stored in the same LU as the quoting document file in the rule. As a result, it can be seen from an index 422 of FIG. 10 that the document files doc1 and doc3 including three keywords key1, key5, and key7 are stored in the LU2. It can be seen from an index 432 that the document files doc2 and doc4 including three keywords key4, key7, and key9 are stored in the LU3. In the index 432, the document file doc5 quoted by the doc2 is also stored in the LU3. In an index 442, it can be seen that the document file doc6 without any common keyword is stored in the LUL4.

Figure 11:
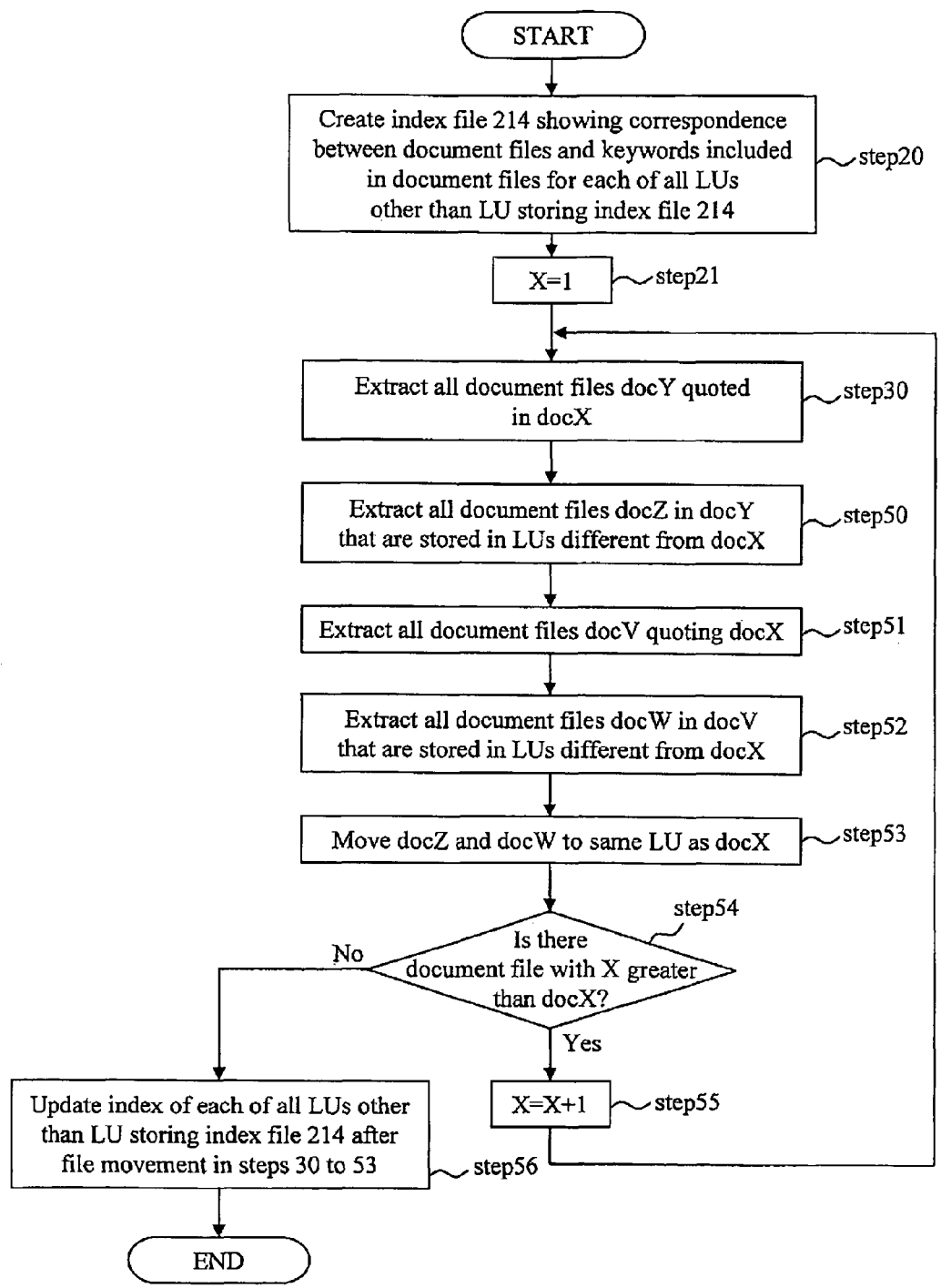
FIG. 11 is a flow chart for explaining a process of storing a document file to be quoted in the same LU as a quoting document file and updating the index file 214 in the third embodiment.

The above described process will be described with reference to FIG. 11. FIG. 11 is a flow chart for explaining a process of storing a document file to be quoted in the same LU as a quoting document file and updating the index file 214.

The search engine 210 first creates an index showing a correspondence between the document files stored in each LU and the keywords included in the document files for each LU other than the LU1 storing the index file 214 (step 20). The search engine 210 then sets the document files to be processed to the doc1 (sets X of docX to 1) (step 21).

The search engine 210 then extracts all document files (docY) quoted in the doc1 (docX) (step 30) and extracts all document files (docZ) in the docY that are stored in LUs different from the LU storing the doc1 (docX) (step 50). The search engine 210 further extracts all document files (docV) that quote the doc1 (docX) (step 51).

Subsequently, the search engine 210 extracts document files docW in the extracted docV that are stored in LUs different from the LU storing the doc1 (docX) (step 52).

The search engine 210 instructs the disk controller 310 to move the docZ and the docW into the LU storing the doc1 (docX), and in response to the instruction, the disk controller 310 moves the document files between the LUs (step 53).

The search engine 210 then checks whether there is a document file with X greater than the docX (doc1) (step 54). If there is such a document, the process moves to step 30 through step 55, and the processes of steps 30 to 53 are repeated. If there is no such a document file, the process moves to step 56.

Lastly, the search engine 210 integrates and updates the index of the LUs after the document file movement and updates the index file 214 (step 56).

In the example of FIG. 10, when the user performs a full-text search with the same keywords as in the second embodiment, the search result is the same as in FIG. 9. If the LUs storing the highest to the third highest document files in the result are to be activated from the power saving state to the normal operation state, the LU2 and the LU3 are activated from the power saving state to the normal operation state before the user actually selects a candidate document file. As a result, the apparent reading time can be reduced as the LU3 is activated in advance when the user actually performs an operation of selecting and reading the document file doc2. Furthermore, since the doc5 quoted by the doc2 is also stored in the LU3, the user can read out the doc5 from the already activated LU3 when the user attempts to read out the doc5 in the process of referring to the doc2. Therefore, the activation process from the power saving state to the normal operation state is not necessary, and the user can quickly read out the doc5.

4) Fourth Embodiment

In a fourth embodiment, the following point is changed from the third embodiment shown in FIG. 10. In the rule of the fourth embodiment, when there is another document file quoted in a document file, although the information is also stored in the index file, the quoted document file is not stored in the same LU as the quoting document file, as a result, the LUs remain divided.

Figure 12:
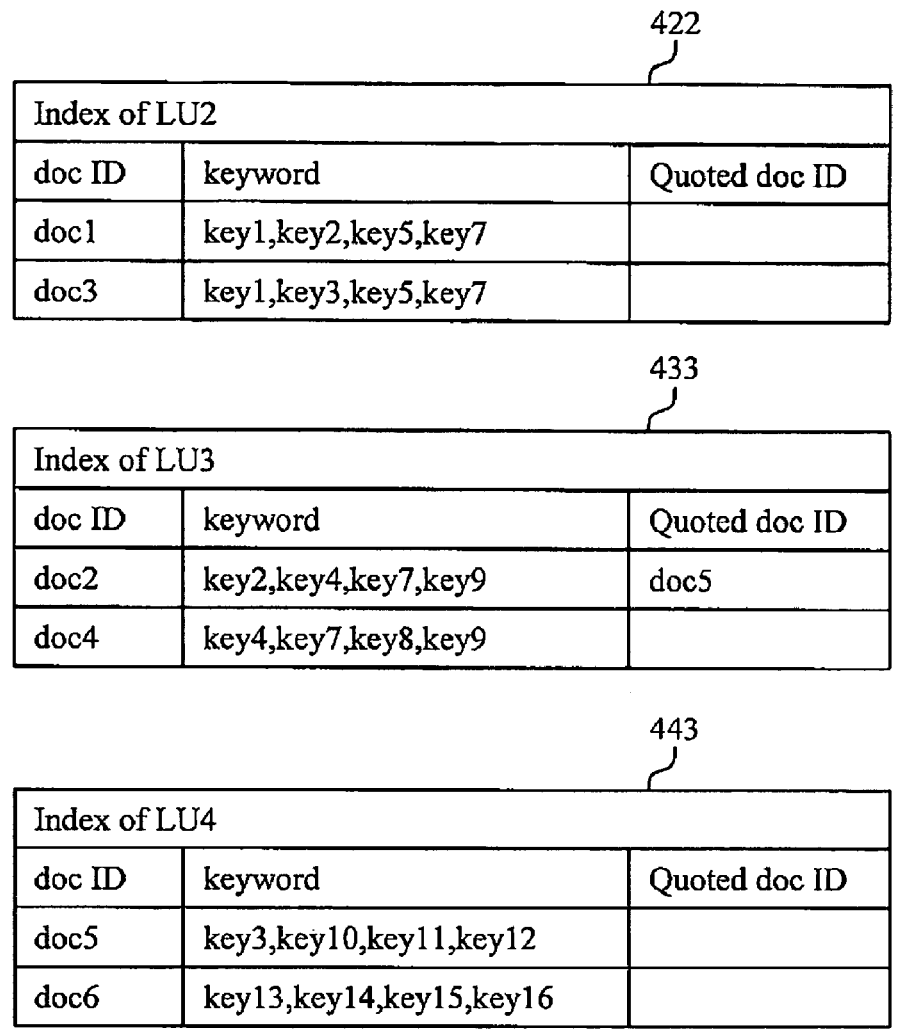
FIG. 12 is a diagram of an example of a search index file in a fourth embodiment.

FIG. 12 is a diagram of an index file applying the rule. In FIG. 12, reference numeral 433 denotes an index of the LU3 and indicates the document file doc2 includes the document file doc5 as a quoted document file. In the example of FIG. 12, the doc5 is not stored in the LU3 storing the doc2 but is stored in the LU4.

In the present embodiment, the LUs storing the highest three document files in the search result are activated from the power saving state to the normal operation state, and when the user inputs four keywords key1, key2, key5, and key7 into 501 to perform a search, the search result will be the same as FIG. 9. In the present embodiment, the LU2 and the LU3 storing the highest three document files are activated from the power saving state to the normal operation state, and at the same time, the LU4 storing the doc5 quoted by the third document file doc2 is also activated from the power saving state to the normal operation state.

Figure 13:
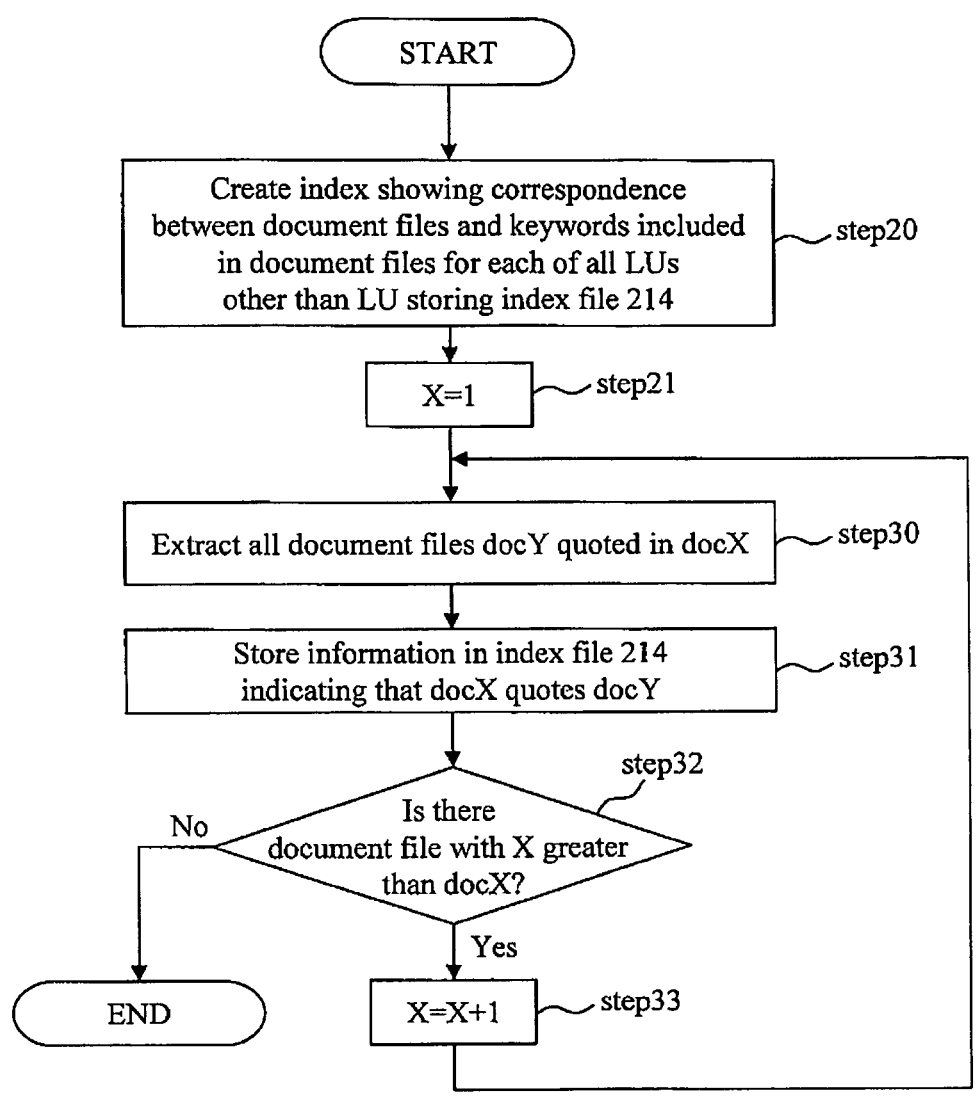
FIG. 13 is a flow chart for explaining a process of creating the index file 214 shown in FIG. 12.

The above described process will be described with reference to FIGS. 13 and 14. FIG. 13 is a flow chart for explaining a process of creating the index file 214 shown in FIG. 12.

The search engine 210 first creates an index showing a correspondence between the document files stored in each LU and the keywords included in the document files for each LU other than the LU1 storing the index file 214 (step 20). The search engine 210 then sets the document files to be processed to the doc1 (sets X of docX to 1) (step 21).

The search engine 210 then extracts all document files (docY) quoted in the doc1 (docX) (step 30) and stores information in the index file 214 indicating that the docX quotes the docY (step 31).

Subsequently, the search engine 210 checks whether there is a document file with X greater than the docX (doc1) (step 32). If there is such a document file, the process moves to step 30 through step 33, and the processes of steps 30 to 32 are repeated. If there is no such a document file, the process ends.

Figure 14:
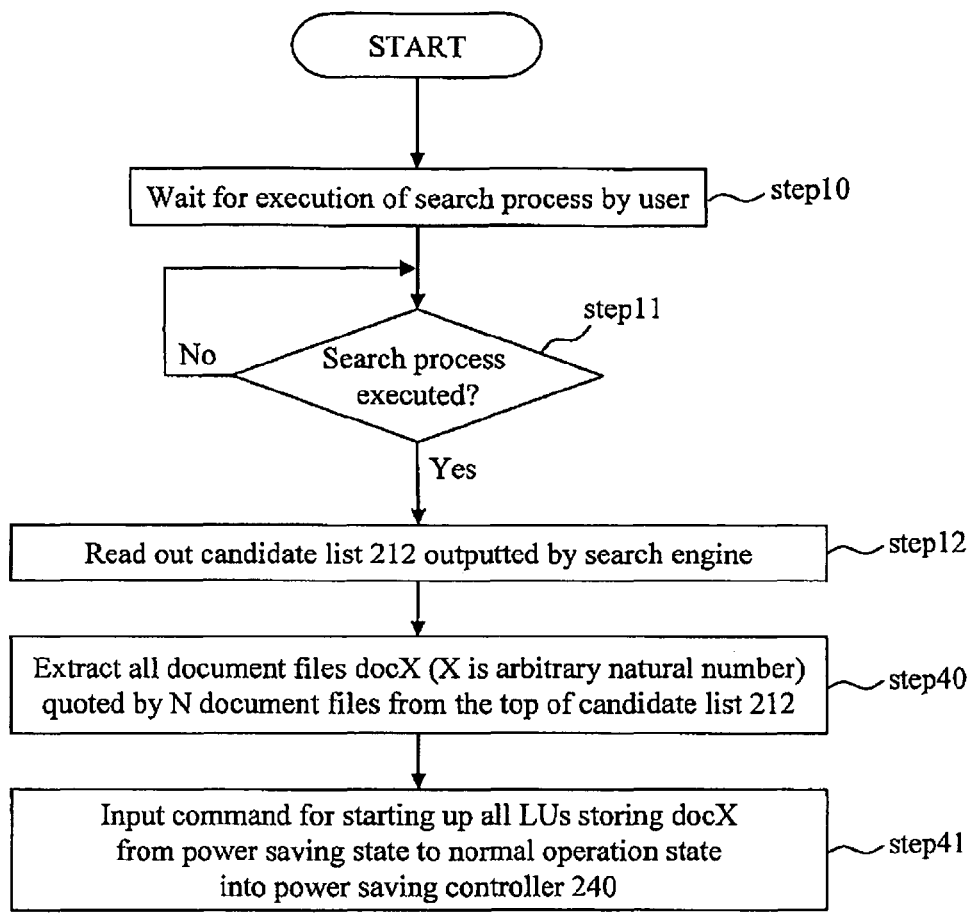
FIG. 14 is a flow chart for explaining a process of activating LUs storing document files to be quoted into a power saving state in the fourth embodiment.

FIG. 14 is a flow chart for explaining a process of activating an LU storing a document file to be quoted into the normal operation state.

According to FIG. 14, the LU startup/power saving processor 220 waits for an execution instruction of search process to the search engine 210 by the user (steps 10 and 11). After recognizing the execution of the search process, the LU startup/power saving processor 220 reads out the candidate list 212 outputted by the search engine (step 12). Meanwhile, the search engine 210 displays the candidate list 212 on the output device (display) 20.

The LU startup/power saving processor 220 then extracts all document files docX (X is an arbitrary natural number) quoted by N (N is a natural number) document files from the highest result of the candidate list 212 (step 40).

Subsequently, the LU startup/power saving processor 220 transmits a command for starting up all LUs storing the extracted docX from the power saving state to the normal operation state to the power saving controller 240 (step 41). After receiving the command, the power saving controller 240 instructs the disk controller 310 to start up the relevant LUs through the input/output controller 260 and the disk I/F adapter 270. The disk controller 310 starts up the relevant LUs based on the instruction.

Employing the configuration and executing the operation can prevent the files from being concentrated on a specific LU while reducing the apparent reading time by the user by also activating in advance the LUs storing the document files, which will likely be read out, into the normal operation state.

5) Fifth Embodiment

<Configuration of Search System>

Figure 15:
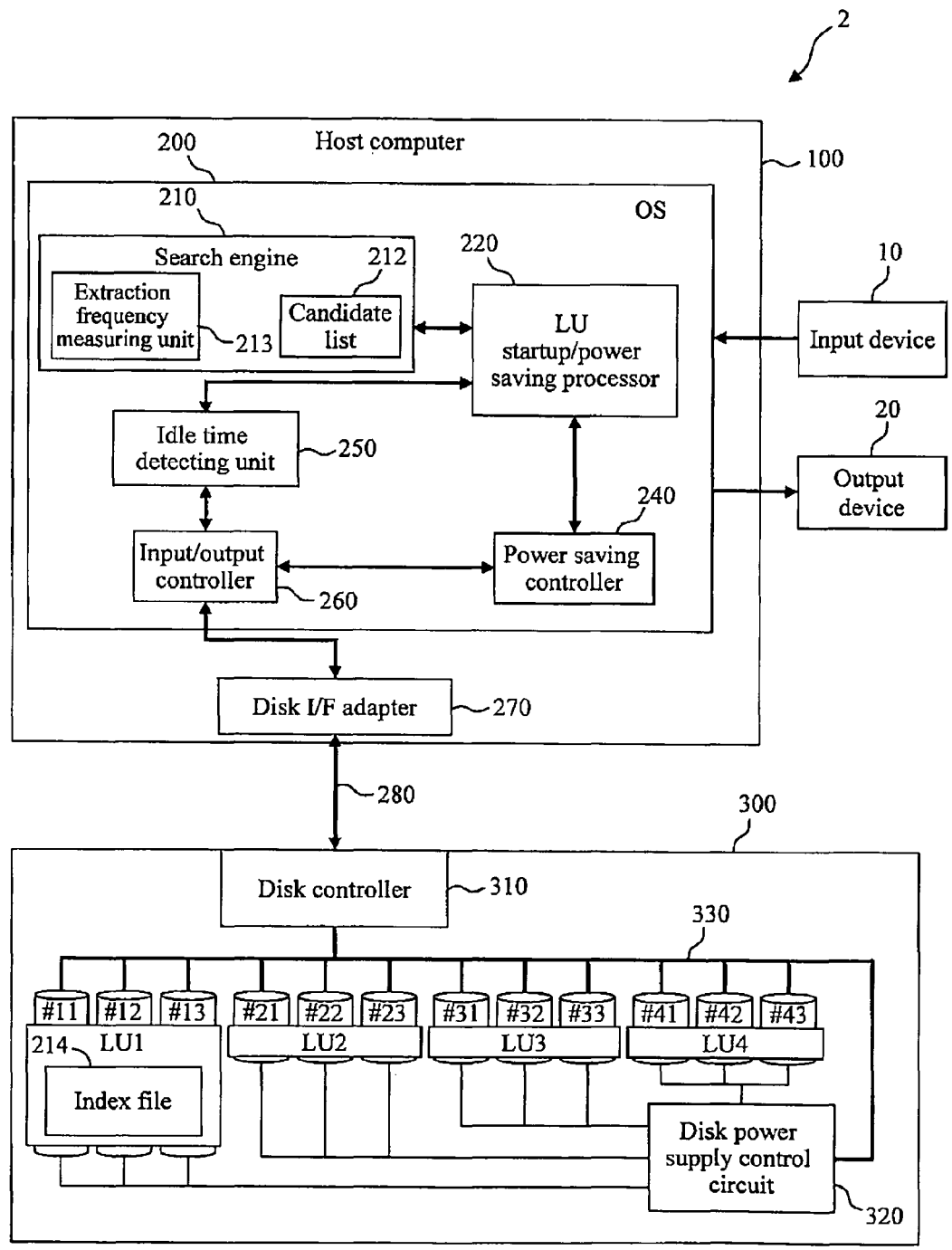
FIG. 15 is a diagram of a schematic configuration example of a search system in a fifth embodiment.

FIG. 15 is a diagram of a schematic configuration of a search system 2 in, a fifth embodiment. Although the search system 2 comprises substantially the same configuration as the search system 1 shown in FIG. 1 (first to fourth embodiments), the search engine 210 further comprises an extraction frequency measuring unit 213. The extraction frequency measuring unit 213 executes a process of measuring an extraction frequency of the document files during the full-text search by the user.

In the operation of the fifth embodiment, the following point of the operation of the second embodiment is changed. In the rule of the second embodiment, the files including three or more keywords are stored in the same LU when the index is created, and the weakly related files including two or less keywords are also stored in another same LU. Meanwhile, the fifth embodiment further employs a rule that the document files exceeding a predetermined number of cases (50 or more cases in the present embodiment) are stored in the same LU based on the extraction frequency measurement result of the extraction frequency measuring unit 213.

FIG. 16 is a diagram of the index file 214 (example) applying the additional rule. According to an index 424 in the example of FIG. 16, the document files doc1 and doc3 including three keywords key1, key5, and key7 are stored in the LU2, and the doc1 and the doc5 in which the frequency of extraction by the user is 50 or more cases are stored in the common LU2. According to an index 434, the document files doc2 and doc4 including three keywords key4, key7, and key9 are stored in the LU3. Furthermore, according to an index 444, the document file doc6 including no common keywords is stored in the LU4.

<Frequency Measuring Process>

Figure 17:
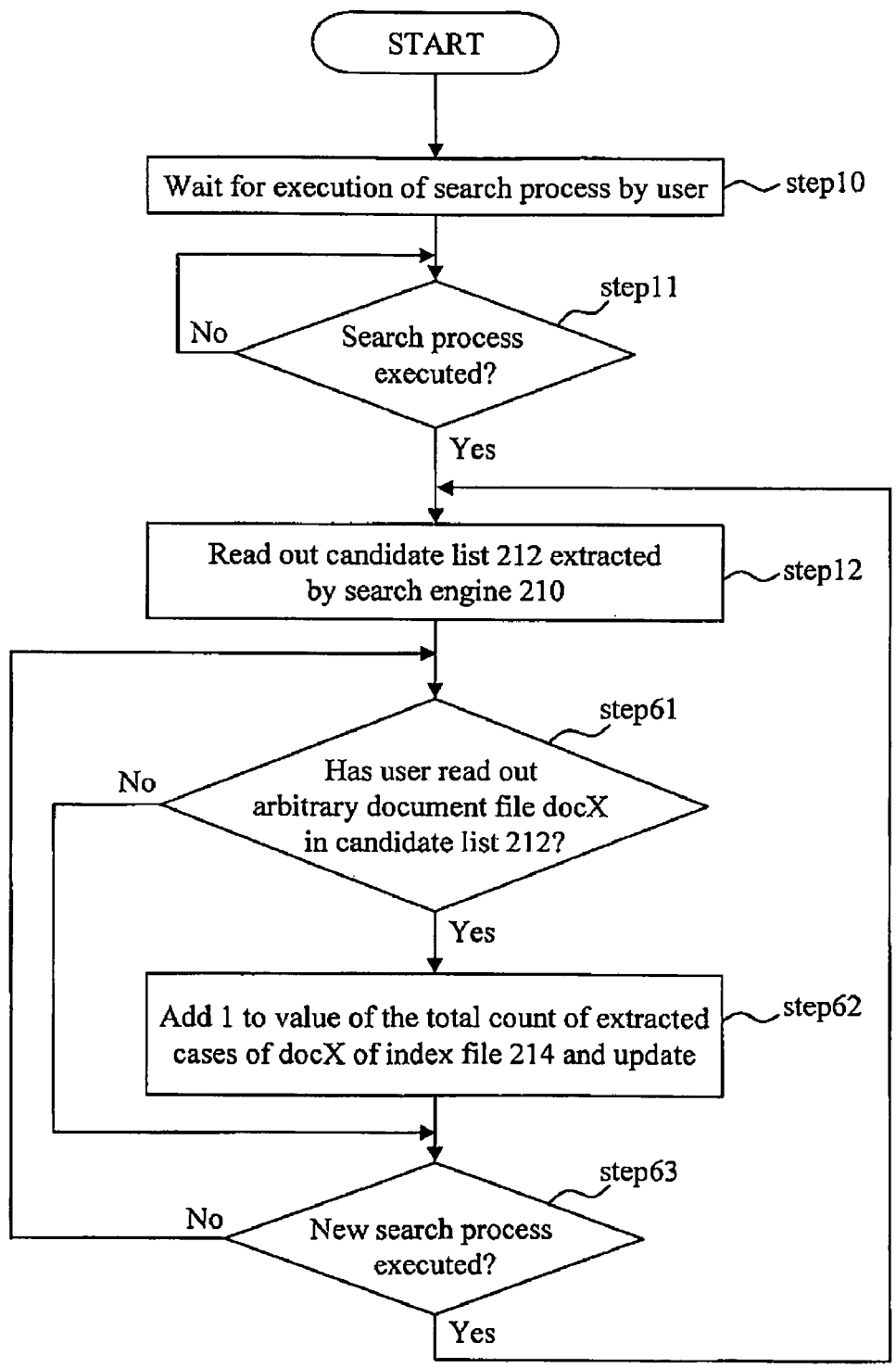
FIG. 17 is a flow chart for explaining a process in which an extraction frequency measuring unit 213 measures the extraction frequency (number of times) of document files and updates frequency information that is recorded for each document file in the index file 214 in the fifth embodiment.

A frequency measuring process will be described in detail with reference to FIG. 17. FIG. 17 is a flow chart for explaining a process in which the extraction frequency measuring unit 213 measures the extraction frequency (number of times) of document files and updates frequency information that is recorded for each document file in the index file 214. The extraction frequency of the process example is defined as the number of times the user reads the document file within an interval time (for example, 24 hours) in which the index file 214 is updated. Therefore, the frequency information (reading frequency) is cleared to zero at the timing (such as late at night) the search engine 210 updates the index file 214.

According to FIG. 17, the search engine 210 waits for an instruction of search process execution by the user (steps 10 and 11). When the search process is executed, the search engine 210 creates the candidate list 212. The frequency measuring unit 213 then reads out the created candidate list 212 (step 12). Meanwhile, the search engine 210 displays the candidate list 212 on the output device (display) 20.

The extraction frequency measuring unit 213 then determines whether there is an arbitrary docX read out by the user in the document files included in the created candidate list 212 (step 61). If there is no docX, the process moves to step 63, and if there is docX, the process moves to step 62.

In step 62, the extraction frequency measuring unit 213 adds 1 to the total count of extracted cases of the docX included in the index file 214 and updates the information.

Lastly, the search engine 210 determines whether a new search process is executed, and the process returns to step 12 when a new search process is executed (step 63).

<Updating Process of Index File>

Figure 18:
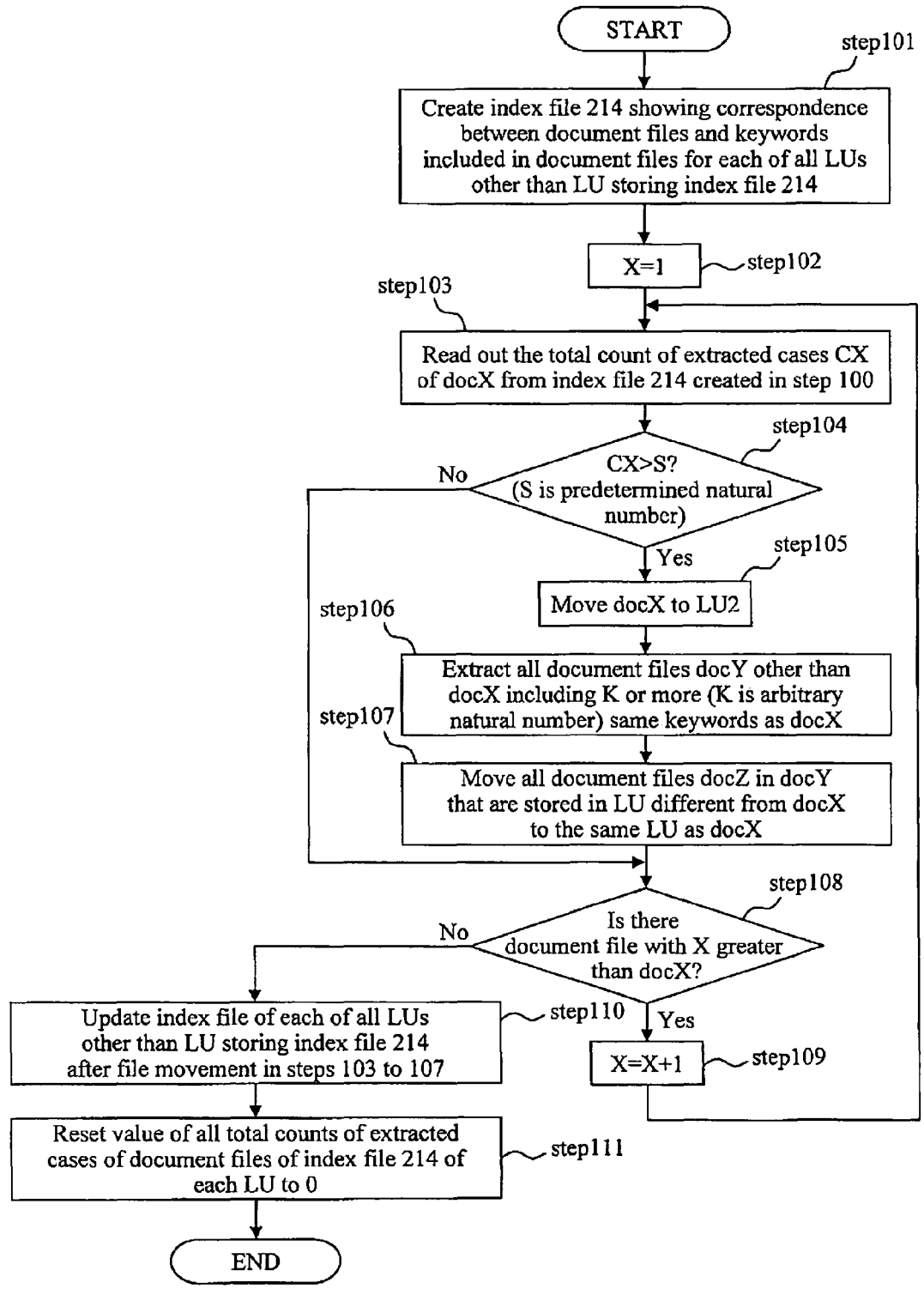
FIG. 18 is a flow chart for explaining an LU movement of document files and an updating process of the index file 214 following an additional rule in the fifth embodiment.

An LU moving process of document file and an updating process of the index file 214 in the fifth embodiment will now be described. FIG. 18 is a flow chart for explaining an LU movement of document file and an updating process of the index file 214 following the additional rule.

The search engine 210 creates an index indicating an association of the document files and the keywords included in the document files for each of all LUs other than the LU (LU1) storing the index file 214 and updates the index file 214 (step 101). For example, if a new file is added or updated after the last updating operation of the index file, a keyword extracting operation is executed for the file.

The search engine 210 then sets X=1 and first sets the document files to be processed to doc1 (docX) (step 102).

The search engine 210 then reads out the total count of extracted cases CX that the doc1 (docX) is read out from the index file 214 created in step 101 (step 103) and determines whether CX is greater than a predetermined set value S (step 104). If CX>S, the process moves to step 105, and if CX=S or CX<S, the process moves to step 108.

In step 105, the search engine 210 issues a command to the disk controller 310 to move the doc1 (docX) to the LU2, and in response to the command, the disk controller 310 moves the doc1 (docX) to the LU2 (step 105). If the doc1 (docX) is already stored in the LU2, the document file is not actually moved.

The search engine 210 further extracts all files docY other than doc1 (docX) that include K or more (K is an arbitrary natural number) same keywords as the doc1 (docX) (step 106). The search engine 210 then commands the disk controller 310 to move all document files docZ in the docY that are stored in LUs different from the LU storing the doc1 (docX) to the LU storing the doc1 (docX), and in response to the command, the disk controller 310 moves the relevant document files docZ to the LU2 (step 107).

The search engine 210 further determines whether there is a document file with X greater than the doc1 (docX) (step 108), and if there is such a document file, the processes of steps 103 to 108 are repeated through step 109. If the process is completed for all files, the process moves step 110.

In step 110, the search engine 210 creates an index of each LU after the document files are moved in the above described steps 103 to 107 for all LUs other than the LU (LU1) storing the index file 214 and updates the index file 214. The search engine 210 further resets the values of the total count of extracted cases of all document files in the updated index file 214 to zero (step 111), and the process ends.

According to the present embodiment, the number of LUs activated from the power saving state to the normal operation state can be narrowed down by consolidating the document files including common keywords into a common LU and consolidating the files with high frequency of extraction by the user into the common LU. For example, in the present embodiment, if the user inputs four keywords key1, key2, key5, and key7 to perform a search as in the first embodiment, the GUI screen of the search result is as shown in FIG. 9. If it is set that the storage location LUs of from the highest candidate document file to the second candidate document file in the search result are to be activated into the normal operation state, only the LU2 needs to be activated. As a result, since the document file doc5 with high frequency of extraction by the user is also stored in the LU2 in FIG. 16, the doc5 can be quickly read out when the user reads out the document file doc5 with high extraction frequency in the future. Furthermore, the LUs to be activated can be narrowed down, and the effectiveness of power saving can be increased by removing unnecessary activation processes of the LUs.

<Startup Process from Power Saving State>

In the present embodiment, only the storage location LUs of the document files with high frequency of extraction by the user in the candidate list 212 extracted from the search result may be activated into the normal operation state. For example, when the user inputs three keywords key8, key9, and key10 to perform a search, the search result is as in FIG. 19 based on the information of the index file of FIG. 16.

Figure 19:
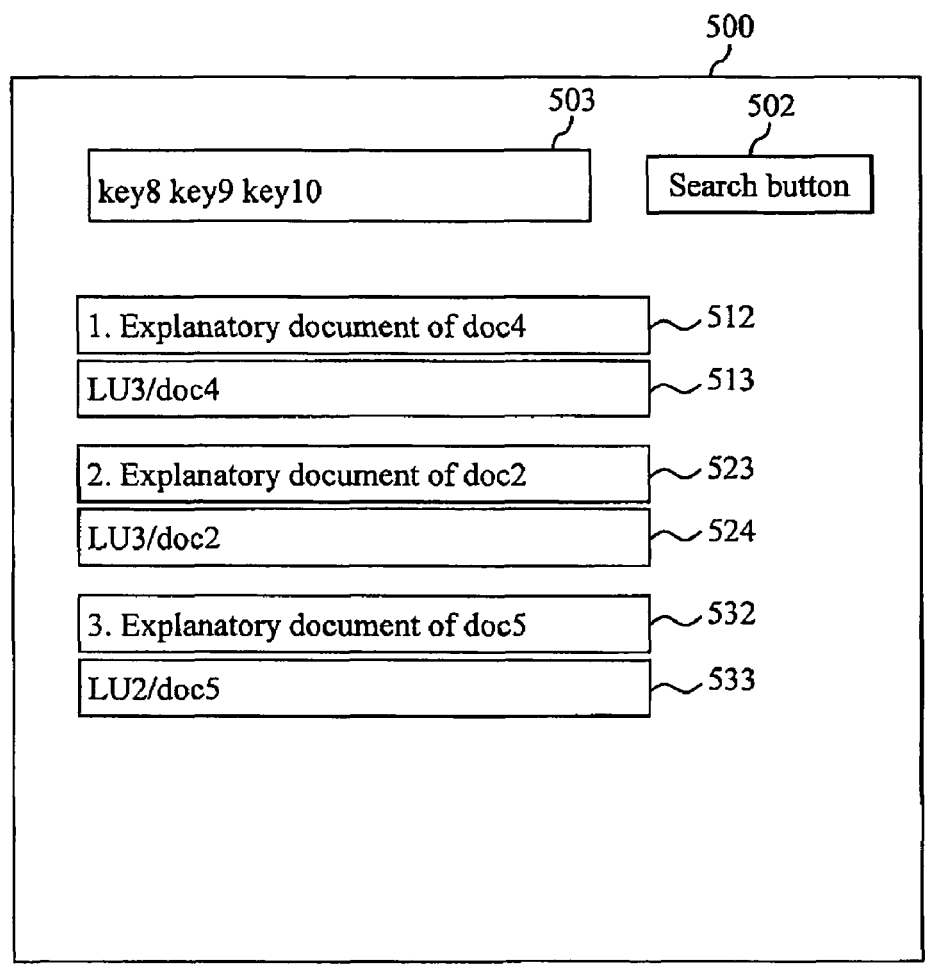
FIG. 19 is a diagram of an example of a search screen display in the fifth embodiment.

In FIG. 19, the document file doc4 including two keywords is lined up at the highest candidate, and the document files doc2 and doc5 including one keyword are lined up second and third in sequence. Among three document files, only the LU2 storing the document file doc5, in which the frequency of extraction by the user is 50 or more cases, is activated from the power saving state to the normal state. In this case, only the storage LU of the document files that will likely be actually read out is activated based on the past results of the number of times read out as a result of full-text search. Therefore, unnecessary activation processes of LU can be removed, and the effectiveness of power saving is increased.

Figure 20:
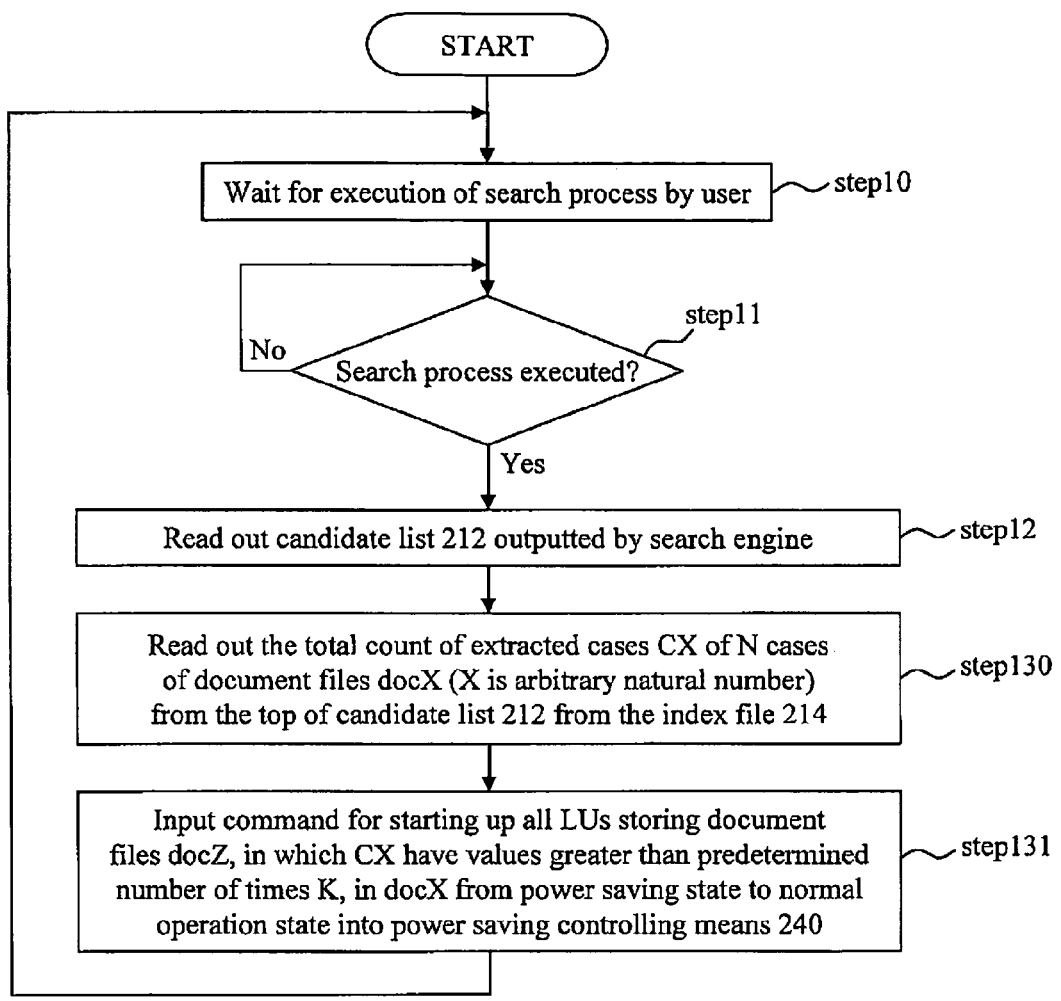
FIG. 20 is a flow chart for explaining a process of starting up only LUs storing document files with extraction frequency of more than a predetermined number of cases from the power saving state to the normal operation state in the fifth embodiment.

The process for starting up the LUs in the power saving state described above will be described with reference to FIG. 20. FIG. 20 is a flow chart for explaining the process of starting up only the LUs storing document files with extraction frequency of more than a predetermined number of cases from the power saving state to the normal operation state.

The LU startup/power saving processor 220 waits for an execution instruction of search process to the search engine 210 by the user (steps 10 and 11). After recognizing the execution of the search process, the LU startup/power saving processor 220 reads out the candidate list 212 outputted by the search engine (step 12). Meanwhile, the search engine 210 displays the candidate list 212 on the output device (display) 20.

The LU startup/power saving processor 220 reads out the total count of extracted cases CX of N cases of document files docX (X is an arbitrary natural number) from the highest file of the candidate list 212 from the index file 214 (step 130).

The LU startup/power saving processor 220 then transmits a command for starting up all LUs storing the document files docZ, in which the CX have values greater than a predetermined value K, in the N cases of files docX from the power saving state to the normal state to the power saving controller 240 (step 131). After receiving the command, the power saving controller 240 transmits a startup command of the relevant LUs to the disk controller 310, and the disk controller 310 starts up the relevant LUs based on the command.

In this way, the LUs that will likely be needed can be efficiently started up. The extraction frequency of the document file measured in the present embodiment may be a frequency within a certain period or may be an accumulated value within a certain period (for example, accumulated cases within one month), and the method is not particularly limited.

6) Sixth Embodiment

<Configuration of Search System>

Figure 21:
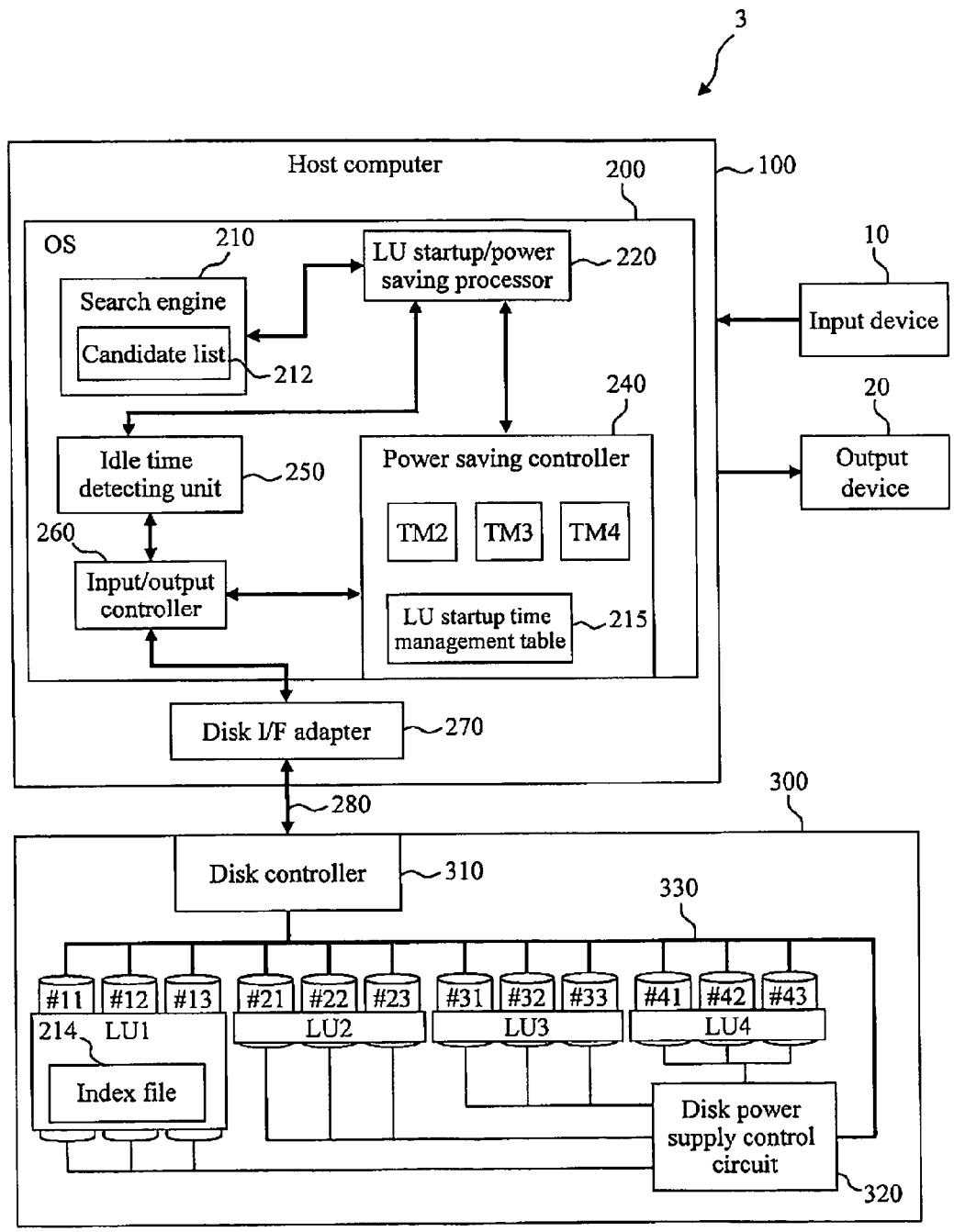
FIG. 21 is a diagram of a schematic configuration example of a search system in a sixth embodiment.

FIG. 21 is a diagram of a schematic configuration of a search system 3 of a sixth embodiment. As shown in FIG. 21, unlike in the second embodiment, the power saving controller 240 of the search system includes timers TM2, TM3, and TM4 of respective LUs that are subject to power, saving, measures time until the LUs that are candidates of activation from the power saving state to the normal operation state are activated into the normal operation state (hereinafter referred to as "LU startup time"), and records the LU startup time to an LU startup time management table 215. The search engine 210 displays the LU startup time read out from the LU startup time management table 215 to the GUI of the result of full-text search by the user.

<Startup Time Display>

Figures 22, 23:
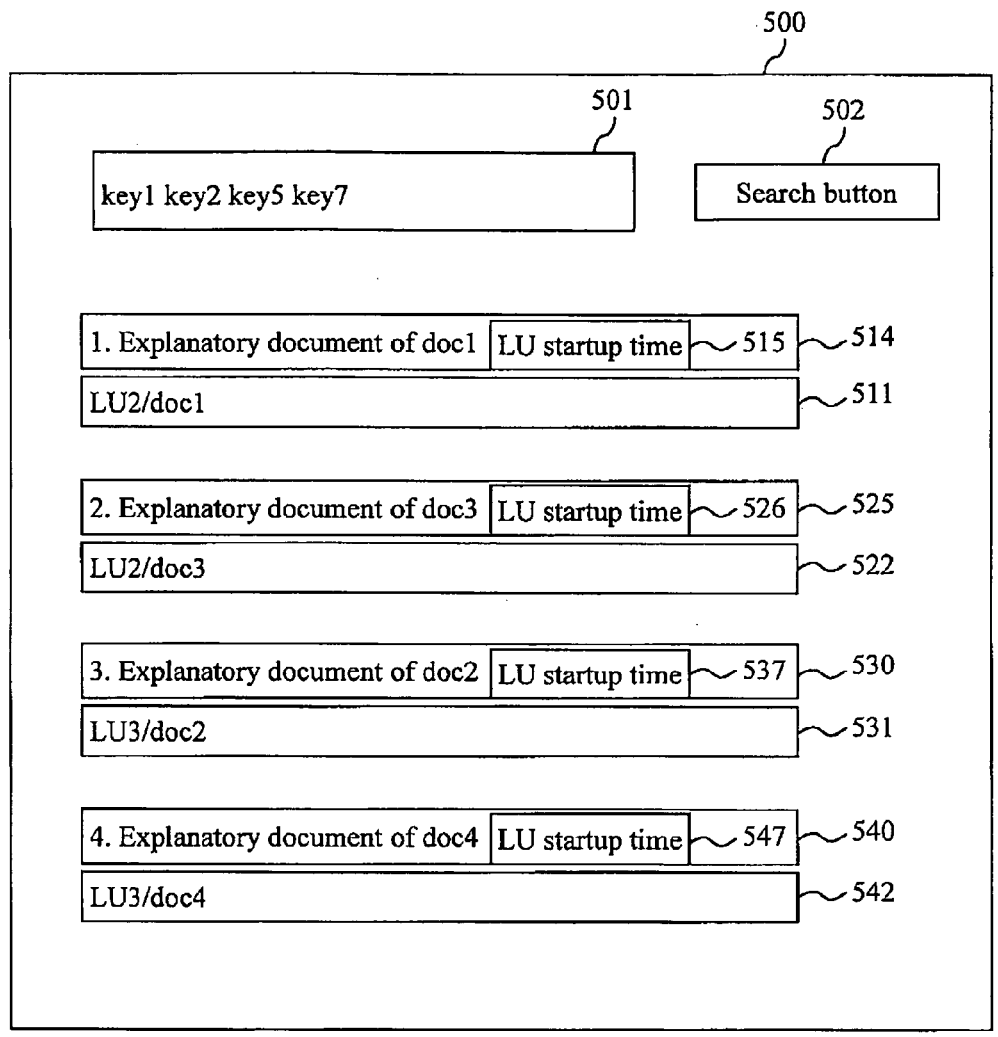
FIG. 22 is a diagram of an example of a search screen display in the sixth embodiment.
FIG. 23 is a diagram of a configuration of an LU startup time management table 215 in the sixth embodiment.

FIG. 22 is a diagram of a GUI display in the sixth embodiment, the GUI display illustrating a search result when four keywords key1, key2, key5, and key7 are inputted for searching. The difference between the display of FIG. 22 and the GUI display of the second embodiment (FIG. 9) is that there are notations 515, 526, 537, and 547 showing the LU startup time of the storage location LUs in an explanatory document 514 of the highest candidate document file doc1, an explanatory document 525 of the second highest candidate document file doc3, an explanatory document 530 of the third highest candidate document file doc2, and an explanatory document 540 of the fourth highest candidate document file doc4. The LU startup time notations allow the user to recognize how much time is required to read out each document file. The user can postpone reading out a document file that takes a long time to read out and can first select and read out a document file that can be read out in a short time. As a result, a function of reducing the stress of the user requiring a long time for file reading can be provided.

<Power Saving Control Process>

Figure 24:
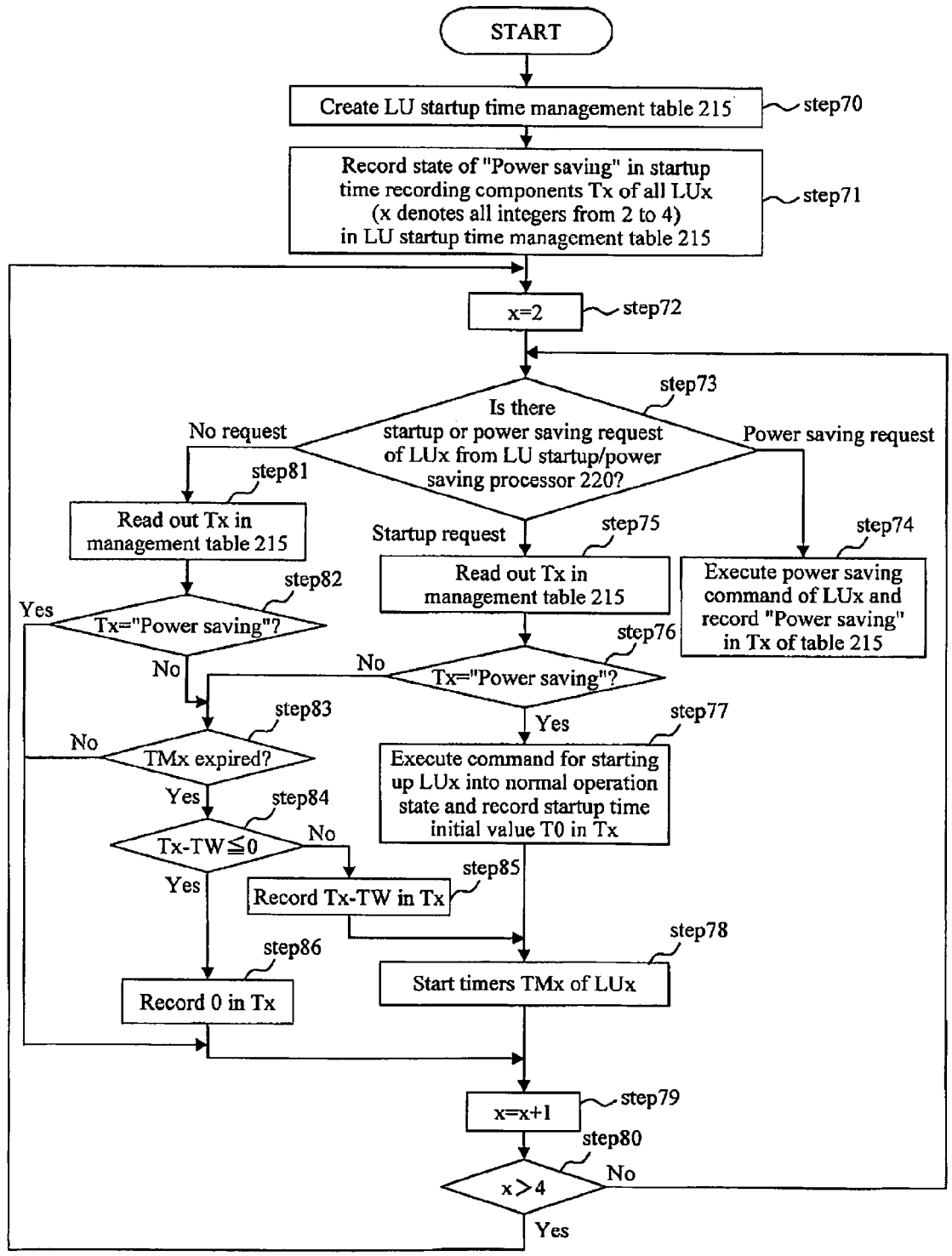
FIG. 24 is a flow chart for explaining a process by a power saving controller 240 in the sixth embodiment.

A power saving control process in the sixth embodiment will be described with reference to FIGS. 23 and 24. FIG. 23 is a diagram of a configuration of the LU startup time management table 215. FIG. 24 is a flow chart for explaining a process by the power saving controller 240. The time after inputting a command for starting up from the power saving state to the normal operation state until the activation into the normal operation state is defined as T0. The expiration time of a timer TMx is defined, as TW.

In FIG. 23, the LU startup time management table 215 holds the time required for starting up the LUs (LU2 to LU4). After the search result is displayed as in FIG. 22, the startup time of each LU is read out from the LU startup time management table 215, the time corresponding to the LU startup time 515, 526, 537, 547 . . . are displayed, and the countdown is started. As a result, the time for the completion of the LU startup is visually apparent, and the user can easily determine which document file to see and check (open).

Referring to FIG. 24, the power saving controller 240 first creates the LU startup time management table 215 (step 70) and records the state of power saving to startup time recording components Tx of all LUx (in the embodiment, x=an integer from two to four) shown in the LU startup time management table 215 (step 71). The power saving controller 240 then sets x=2 (step 72).

Next, the power saving controller 240 determines whether there is a startup or power saving request of the LUx from the LU startup/power saving processor 220 (step 73). If there is a power saving request, the process moves to step 74, and the power saving controller 240 executes the power saving command of the LUx and writes down "power saving" to Tx of the LU startup time management table 215 (step 74). If there is a startup request, the process moves to step 75. If there is no request, the process moves to step 81.

The power saving controller 240 reads out Tx in the startup time management table 215 at this point (step 75) and determines whether Tx is power saving (step 76). If Tx is not power saving, the process moves to step 83, and if Tx is power saving, the process moves to step 77. In step 77, the power saving controller 240 issues a command for starting up the LUx into the normal state to the disk controller 310 and writes down a startup time initial value T0 in Tx. The power saving controller 240 starts the timer TMx of the LUx (step 78). The power saving controller 240 further increments x (step 79) and determines whether the incremented x (number of LU) is greater than four (step 80). If x>4, the process moves to step 72, and if x=4 or X<4, the process moves to step 73.

Meanwhile, if there is neither startup request nor the power saving request in step 73, the power saving controller 240 reads out Tx in the startup time management table 215 (step 81) and determines whether Tx is power saving (step 82). If Tx is power saving, the process moves to step 79, and if Tx is not power saving, the process moves to step 83.

In step 83, the power saving controller 240 determines whether the timer TMx has reached the expiration time TW. If the timer has not reached TW, the process moves to step 79, and if the timer has reached TW, the process moves to step 84.

In step 84, the power saving controller 240 compares the time Tx until startup and the timer expiration time TX (determines whether Tx−TW=0 or Tx−TW<0). If Tx=TW or Tx<TW, the process moves to step 86, the time Tx until startup is set to 0, and 0 is displayed at the startup time recording component. The process then moves to step 79.

On the other hand, if Tx>TW, the process moves to step 85, the time until startup is set to Tx−TW, and Tx−TW is displayed at the startup time recording component. The process then moves to step 78.

Although the LU startup time (time required for startup) is written in FIG. 22, the notations may be simple so that just whether the storage location LU of the document file is in normal operation or power saving can be recognized. For example, only the document files in which the storage location LUs are in the power saving state or in transition from the power saving state to the normal operation state can be attached and written with special symbols.

The power saving controller 240 comprises means for communicating with the LU startup/power saving processor 220, and the means can be easily realized by a known technique in which, for example, the LU startup/power saving processor 220 transmits a command for activating the LUs from the power saving state to the normal operation state to the power saving controller 240, the time until the LUs are actually activated into the normal operation state is measured and held in advance or held as a parameter in advance, and the LU startup/power saving processor 220 utilizes the timer function of the OS 200 to calculate and display the remaining time after the input of the activating command until the normal operation state. The realization method is not a direct object of the present invention, and the detailed description will be omitted.

7) Seventh Embodiment

<Configuration of Search System>

Figure 25:
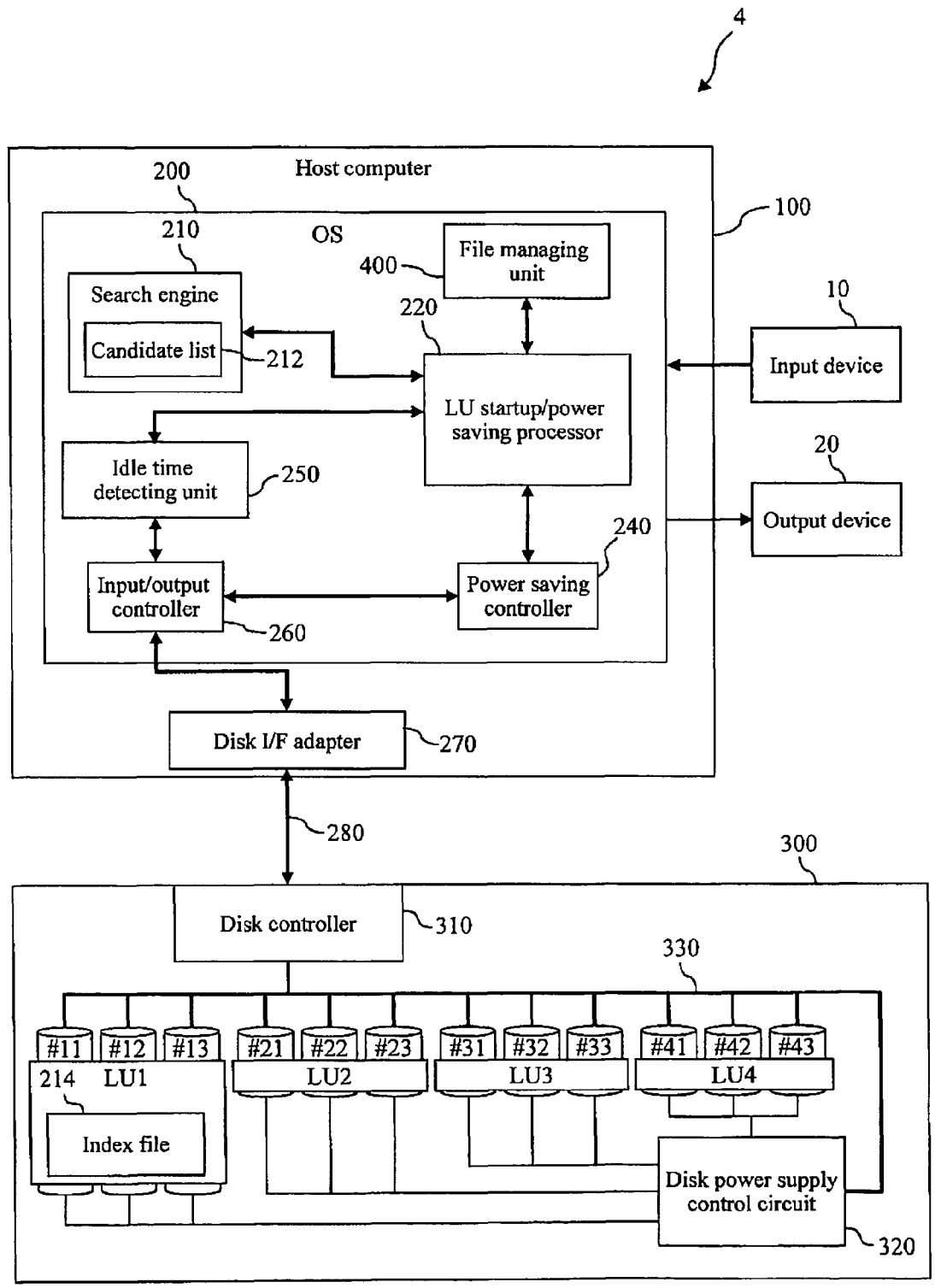
FIG. 25 is a diagram of an example of a system configuration in a seventh embodiment.

FIG. 25 is a diagram of a schematic configuration of a search system 4 of a seventh embodiment. In FIG. 25, after checking that file managing means 400 represented by a Web browser has read out an arbitrary document file docX, the LU startup/power saving processor 220 reads out the index file 214, searches the index file 214 to extract document files docY including more than a predetermined number of common keywords with the document file docX as a target of the reading request by the user, further extracts LUs storing the extracted document files, and transmits a command for activating the LUs from the power saving state to the normal operation state to the power saving means 240.

<Activation process of LU into Normal Operation State>

Figure 26:
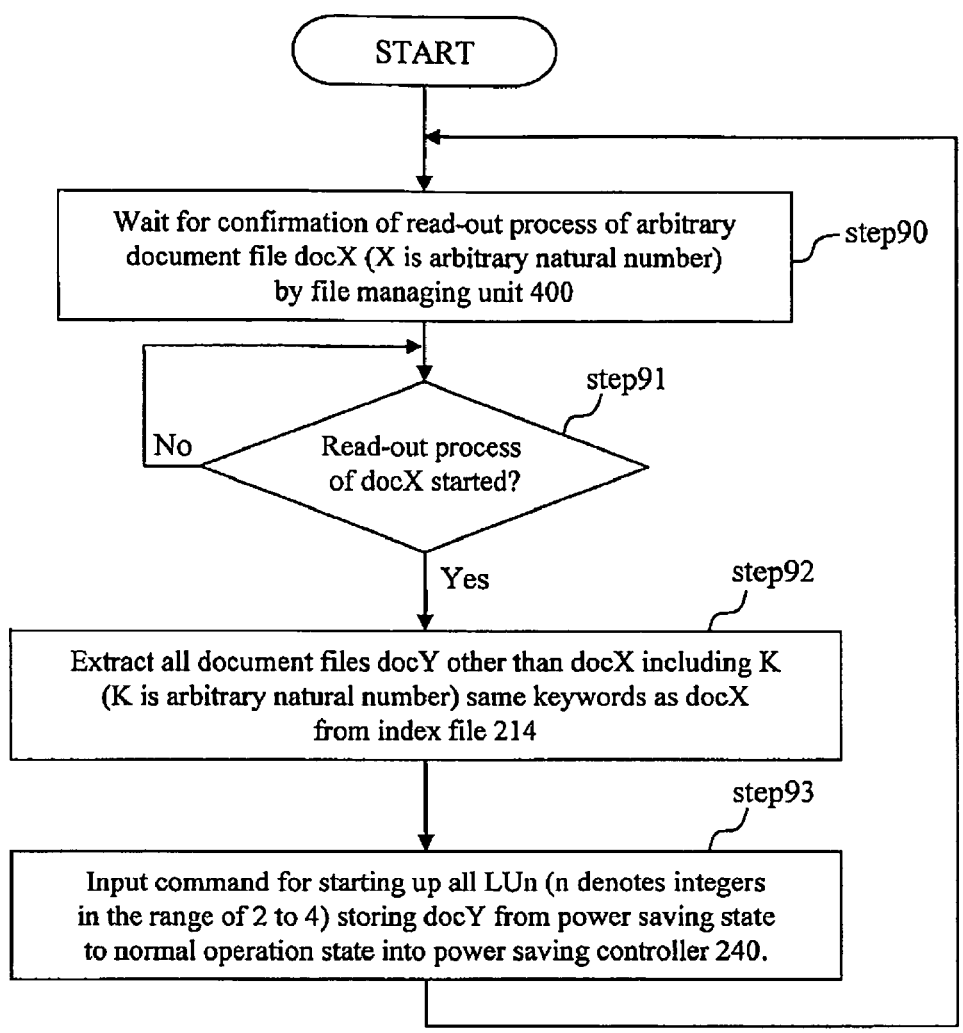
FIG. 26 is a flow chart for explaining a process of activating LUs from the power saving state to the normal operation state by an LU startup/power saving processor 220 in the seventh embodiment.

FIG. 26 is a flow chart for explaining a process of activating LUs from the power saving state to the normal operation state by the LU startup/power saving processor 220.

The LU startup/power saving processor 220 waits until a read-out process of an arbitrary document file docX (X is an arbitrary natural number) by the file managing unit 400 (steps 90 and 91).

After the file managing unit 400 executes the read-out process of docX, the LU startup/power saving processor 220 extracts all document files docY other than docX including K (K is an arbitrary natural number) same keywords as the read out docX from the index file 214 (step 92).

The LU startup/power saving processor 220 then issues a command for starting up all LUn (n denotes integers in the range of 2 to 4) storing docY from the power saving state to the normal operation state to the power saving controller 240 (step 93). The power saving controller 240 notifies the startup command to the disk controller 310, and in response to the command, the disk controller 310 puts the relevant LUs into the normal operation state.

According to the seventh embodiment, when the user uses the file managing unit 400 represented by a Web browser to read out a certain document file, LUs storing other document files that the user will likely read out in the future and that include common keywords with the document file are activated from the power saving state to the normal operation state. As a result, the user can quickly read out the other document files including common keywords in the future.

The LU startup/power saving processor 220 may also refer to the quoted file information included in the index file 214 shown in the third embodiment and activate the LUs storing the document files quoted by the document files read out by the user from the power saving state to the normal operation state.

The LU startup/power saving processor 220 may further refer to the extraction frequency included in the index file 214 shown in the fifth embodiment and activate LUs storing document files that include common keywords with the document file read out by the user and that are high in extraction frequency from the power saving state to the normal operation state. In either case, the document files deeply related to the document file read out by the user can be quickly read out in the future.

In the seventh embodiment, the power saving controller 240 may include the LU startup time management table 215 the same as in the sixth embodiment and means for measuring the LU startup time, and the startup time of the storage LU of the document file that the user attempts to read out using the file managing unit 400 into the normal operation state may be read out from the LU startup time management table 215 to be displayed to the user through the output device 20. The LU startup time display allows the user to recognize how much time is required to read out the selected document file and to execute the read-out process by selecting other document files in advance while the relevant LU is activated. Therefore, the stress of the user requiring a long time to read out the files can be reduced. The LU startup time display method may have the same form as FIG. 22 of the sixth embodiment, and the realizing means is not a direct object of the present invention and will be omitted.

8) Eighth Embodiment

The functions shown in the first to seventh embodiments can be combined as much as possible and applied to the search system.

9) Conclusion

In the first embodiment, when the candidate file list 212 shown in the search result obtained by the search engine 210 is extracted, the LU startup/power saving processor 220 generates a state transition command for making a transition of logical units from the power saving state (such as spindle stop and power supply disconnection), in which the access is not allowed, to the normal operation state (state of the spindle rotating), in which the access is allowed. Meanwhile, in response to the state transition command, the disk controller 310 of the storage 300 activates the spindles of the disk drives constituting the logical units to switch the relevant logical units from the power saving state to the normal operation state. In this way, since the disk drives constituting the relevant logical units are activated before the file selection by the user (when the candidate file list 212 is extracted and displayed), the apparent reading time as seen by the user can be reduced.

More specifically, the LU startup/power saving processor 220 generates a state transition command for making a transition of logical units storing predetermined N (integer N=1 or N>1) files in the candidate file list 212 shown in the search result obtained by the search engine 210 from the power saving state to the normal operation state when the candidate file list 212 is extracted. In response to the state transition command, the disk controller 310 activates the spindles of the disk drives constituting the relevant logical units. In this way, not all logical units are switched to the normal operation state, but the disk drives storing files that will likely be accessed are activated. Therefore, both of the reading efficiency and the power saving can be achieved.

Furthermore, when the user browses predetermined K (integer K (K=1 or K>1) and (K<N or K=N)) files of predetermined N files, logical units storing from N+1 th to predetermined K+Mth (integer M=1 or M>1) files of the files shown in the candidate file list are switched from the power saving state to the normal operation state. In this way, new LUs can be sequentially switched from the power saving state to the normal operation state along with the read-out process by the user. Although the logical units storing the highest to K−1th files of the candidate list 212 are controlled from the normal operation state to the power saving state if a predetermined time has passed without being accessed, the LUs may be determined not to be used before the predetermined time has passed and be automatically put into the power saving state. In this way, only the minimum required logical units can be put into the normal operation state, and power saving can be realized.

The user may be able to set the logical units to be switched from the power saving state to the normal operation state. This allows the user to prioritize the startup of the logical unit storing a file that the user wants to browse.

In the second embodiment, the logical units to be stored are shifted to consolidate the plurality of files with more than a predetermined number of common keywords into the same LU. The index file of each logical unit is then updated. As a result, the strongly related files can be stored in the same logical unit. Therefore, the logical units can be started up efficiently, and power saving can be realized.

In the third embodiment, the index file 214 includes information of files to be quoted as index information of the files. When there are quoted files and quoting files, the quoted files and the quoting files are moved to the same logical unit. The index file 214 is then updated. As a result, the files in a relationship of quoting and quoted can be treated as related files regardless of the keywords, and the logical units can be started up efficiently.

Also in the fourth embodiment, the index file 214 includes information of files to be quoted as index information of the files. The logical unit storing the quoted file is also switched from the power saving state to the normal operation state when the logical unit storing the quoting file is switched from the power saving state to the normal operation state. As a result, the relevant logical unit can be put into the normal operation state even if the quoted and quoting files are not stored in the same logical unit.

In the fifth embodiment, the index file 214 includes extraction frequency information as the index information of the files. The extraction frequency information is designed to be incremented every time the user extracts a file. The files including more than a predetermined number of times of extraction frequency information are controlled to be moved to a specific logical unit. The index file 214 is then generated (updated). As a result, power saving is realized, and the state in which files with many extractions (browses) can be browsed can be quickly set regardless of the keywords. The user may be able to arbitrarily set the extraction frequency as a condition for consolidation into a specific logical unit.

In the sixth embodiment, the time until the logical units are started up is displayed in the candidate file list 212 in the search result. As a result, which logical unit can be read out at what time can be explicitly indicated to the user.

In the seventh embodiment, when the user directly reads out a file using the file managing means 400, the LU startup/power saving processor 220 detects the above described readout process by the user, refers to the index file 214, and extracts files including more than a predetermined number of common keywords with the read out file as related files. The logical units storing the related files are controlled to be switched from the power saving state to the normal operation state. As a result, the logical unit storing a file that the user would like to browse next can be quickly started up. In this case too, since the weakly related logical units remain in the power saving state, the power saving can also be achieved.

The present invention can also be realized by a program code of software realizing the functions of the embodiments. In that case, a storage medium recording the program code is provided to a system or a device, and a computer (or CPU or MPU) of the system or the device reads out the program code stored in the storage medium. In that case, the program code itself read out from the storage medium realizes the above described functions of the embodiments, and the program code itself and the storage medium storing the program code constitute the present invention. Examples of the storage medium for supplying the program code include a flexible disk, a CD-ROM, a DVD-ROM, a hard disk, an optical disk, a magneto-optical disk, a CD-R, a magnetic tape, a nonvolatile memory card, and a ROM.

An OS (operating system) or the like operated on the computer may execute part or all of the actual processes based on an instruction of the program code, and the processes may realize the functions of the embodiments. Furthermore, after the program code read out from the storage medium is written in the memory of the computer, the CPU or the like of the computer may execute part or all of the actual processes based on an instruction of the program code, and the processes may realize the functions of the embodiments.

The program code of the software realizing the functions of the embodiments may be distributed through a network to store the program code in storage means such as a hard disk and a memory of a system or a device or in a storage medium such as a CD-RW and a CD-R, and the computer (or CPU or MPU) of the system or the device may read out and execute the program code stored in the storage means or the storage medium before use.

The invention claimed is:

1. An information processing system including:
 a storage that includes one or more logical units, each of the logical units constituted by one or more disk drives; and
 a host computer that issues an instruction to access the storage to acquire and store data, wherein
 the host computer comprises:
 a search engine that executes a search according to an inputted instruction; and
 an LU startup/power saving processor that generates a first state transition command for switching the logical units from a power saving state, in which the access is not allowed, to a normal operation state, in which the access is allowed, when a candidate file list indicated in a search result obtained by the search engine is extracted, and
 the storage comprises:
 a disk controller that activates spindles of the disk drives constituting the logical units to switch the logical units from the power saving state to the normal operation state in response to the first state transition command, wherein
 the LU startup/power saving processor generates a second state transition command for switching the logical units storing predetermined N cases (integer N>1) of files in a candidate file list indicated in the search result obtained by the search engine from the power saving state, in which the access is not allowed, to the normal operation state, in which the access is allowed, when the candidate file list is extracted, and the disk controller activates the spindles of the disk drives constituting the relevant logical units in response to the second state transition command,
 the host computer or the storage further comprises an index file including index information that is used when the search engine performs a search and that is generated corresponding to each logical unit,
 the search engine generates a first move command for moving a plurality of files with more than a predetermined number of common keywords to the same logical unit and updates the index file,
 the disk controller moves the files to be moved to relevant logical units in response to the first move command,
 the index file further includes information of files to be quoted as index information of the files,
 the LU startup/power saving processor generates a third state transition command for switching a logical unit storing a quoted file from the power saving state to the normal operation state when switching a logical unit storing a quoting file that quotes the quoted file from the power saving state to the normal operation state,
 the disk controller activates the disk drives constituting the logical units storing the quoting file and the quoted file in response to the third state transition command,
 the search engine generates a second move command for moving the quoted file to the same logical unit as the quoting file and updates the index file,
 the disk controller moves the files to be moved to relevant logical units in response to the second move command,
 the index file further includes extraction frequency information as index information of the files,
 the host computer further comprises an extraction frequency measuring unit that increments the extraction frequency information every time the user extracts a file,
 the search engine generates a third move command for moving files including more than a predetermined number of times of the extraction frequency information to a specific logical unit and updates the index file,
 the disk controller moves the files to be moved in response to the third move command, and
 wherein the host computer further comprises:
 an LU startup time management table that manages a startup time required to startup the logical units in association with the logical units;
 time measurement timers; and
 a power saving controller that displays a remaining time until startup of the logical units in the candidate file list, and
 wherein the power saving controller reads out the startup time of the logical units from the LU startup time management table when the candidate file list is extracted, starts the display in the candidate file list in association with the logical units, and displays a countdown of the startup time along with a passage of time in the timers.

2. The information processing system according to claim 1, wherein when the user browses a Kth (integer K=1 or K>1) file from the top of the candidate list, the LU startup/power saving processor generates a fourth state transition command for switching the logical units storing from N+1th to K+M (integer M=1 or M>1) cases of files among the files indicated in the candidate file list from the power saving state to the normal operation state, and the disk controller activates spindles of the disk drives constituting the relevant logical units in response to the fourth state transition command.

3. The information processing system according to claim 2, wherein the LU startup/power saving processor generates a power saving command for switching the logical units storing first to (K−1)th files among the files indicated in the candidate file list from the normal operation state to the power saving state, and the disk controller stops the spindles of the disk drives constituting the relevant logical units in response to the power saving command.

4. The information processing system according to claim 1, wherein the host computer further comprises file managing means used by the user to directly specify and read out a file from the storage, the LU startup/power saving processor refers to the index file to extract files including more than a predetermined number of common keywords with the read out file as related files when a read-out process of files using the file managing means by the user is detected, the LU startup/power saving processor generates a state transition command for switching logical units storing the related files from the power saving state to the normal operation state, and the disk controller activates spindles of the disk drives constituting the logical units storing the related files in response to the state transition command.

5. An information processing method including:

in a host computer that issues an instruction to acquire and store data by accessing a storage that includes one or more logical units each constituted by one or more disk drives, to acquire and store data, using a search engine to execute a search according to an inputted instruction and an LU startup/power saving processor to generate a first state transition command for switching the logical units from a power saving state, in which the access is not allowed, to a normal operation state, in which the access is allowed, when a candidate file list indicated in a search result obtained by the search engine is extracted;

in the storage, using a disk controller to activate spindles of the disk drives constituting the logical units to switch the logical units from the power saving state to the normal operation state in response to the first state transition command;

using the LU startup/power saving processor in the host computer to generate a second state transition command for switching the logical units storing predetermined N cases (integer N>1) of files in a candidate file list indicated in the search result obtained by the search engine from the power saving state, in which the access is not allowed, to the normal operation state, in which the access is allowed, when the candidate file list is extracted;

using the disk controller to activate the spindles of the disk drives constituting the relevant logical units in response to the second state transition command;

using the search engine to generate a first move command for moving a plurality of files with more than a predetermined number of common keywords to the same logical unit;

using the search engine to update an index file that is included in the host computer or the storage and includes index information that is used when the search engine performs a search and generated corresponding to each logical unit, information of files to be quoted as index information of the files, and extraction frequency information as index information of the files;

using the disk controller to move the files to be moved to relevant logical units in response to the first move command;

using the LU startup/power saving processor to generate a second state transition command for switching a logical unit storing a quoted file from the power saving state to the normal operation state when switching a logical unit storing a quoting file that quotes the quoted file from the power saving state to the normal operation state, using the disk controller to activate the disk drives constituting the logical units storing the quoting file and the quoted file in response to the second state transition command, using the search engine to generate a second move command for moving the quoted file to the same logical unit as the quoting file and updates the index file, using the disk controller to move the files to be moved to relevant logical units in response to the second move command, incrementing the extraction frequency information every time the user extracts a file using an extraction frequency measuring unit included in the host computer, using the search engine to generate a third move command for moving files including more than a predetermined number of times of the extraction frequency information to a specific logical unit and updates the index file, using the disk controller to move the files to be moved in response to the third move command; and using a power saving controller included in the host computer that displays a remaining time until a startup of the logical units in the candidate file list to reads out a startup time required to startup the logical units from an LU startup time management table that manage the startup time in association with the logical units when the candidate file list is extracted, starts the display in the candidate file list in association with the logical units, and displays a countdown of the startup time along with a passage of time in time measurement timers.

* * * * *